US012187049B2

(12) United States Patent
Funahashi

(10) Patent No.: US 12,187,049 B2
(45) Date of Patent: Jan. 7, 2025

(54) LASER MARKING APPARATUS FOR PRINTING ON A WORKPIECE MOVING ALONG A THREE-DIMENSIONAL MOVEMENT PATH

(71) Applicant: Keyence Corporation, Osaka (JP)

(72) Inventor: Hayato Funahashi, Osaka (JP)

(73) Assignee: KEYENCE CORPORATION, Osaka (JP)

( * ) Notice: Subject to any disclaimer, the term of this patent is extended or adjusted under 35 U.S.C. 154(b) by 153 days.

(21) Appl. No.: 17/980,578

(22) Filed: Nov. 4, 2022

(65) Prior Publication Data

US 2023/0150274 A1 May 18, 2023

(30) Foreign Application Priority Data

Nov. 17, 2021 (JP) ................................ 2021-186971

(51) Int. Cl.
*B41J 2/47* (2006.01)
*B41J 2/44* (2006.01)

(52) U.S. Cl.
CPC ................ *B41J 2/47* (2013.01); *B41J 2/442* (2013.01); *B41J 2/471* (2013.01)

(58) Field of Classification Search
CPC ............... B41J 2/47; B41J 2/442; B41J 2/471
See application file for complete search history.

(56) References Cited

U.S. PATENT DOCUMENTS 8,153,931 B2 4/2012 Yamakawa et al.
2008/0023455 A1* 1/2008 Idaka .................... B23K 26/03 219/121.73

FOREIGN PATENT DOCUMENTS

JP 200844001 A 2/2008
JP 2016175103 A * 10/2016

OTHER PUBLICATIONS

U.S. Appl. No. 17/980,574, filed Nov. 4, 2022 (151 pages).
U.S. Appl. No. 17/980,576, filed Nov. 4, 2022 (79 pages).
U.S. Appl. No. 17/981,501, filed Nov. 7, 2022 (105 pages).

* cited by examiner

*Primary Examiner* — Henok D Legesse
(74) *Attorney, Agent, or Firm* — Kilyk & Bowersox, P.L.L.C.

(57) ABSTRACT

To perform appropriate printing on a workpiece moving along a three-dimensional movement path. A laser marking apparatus includes: a laser light output section; a laser light scanning section; a print data generation section; a marking control section; and a print pattern correction section that corrects a print pattern received by an input interface based on movement path information related to a movement path of a workpiece moving with a change in a posture in a three-dimensional space. The print data generation section generates print data based on the print pattern corrected by the print pattern correction section.

11 Claims, 15 Drawing Sheets

LASER MARKING APPARATUS FOR PRINTING ON A WORKPIECE MOVING ALONG A THREE-DIMENSIONAL MOVEMENT PATH

CROSS-REFERENCE TO RELATED APPLICATIONS

The present application claims foreign priority based on Japanese Patent Application No. 2021-186971, filed Nov. 17, 2021, the contents of which are incorporated herein by reference.

BACKGROUND OF THE INVENTION

1. Field of the Invention

The technology disclosed herein relates to a laser marking apparatus.

2. Description of Related Art

As printing methods in a laser marking apparatus, moving printing for performing printing on a moving workpiece and stationary printing for performing printing on a stationary workpiece are conventionally known.

For example, JP 2016-175103 A discloses a laser marking apparatus capable of executing moving printing. The laser marking apparatus disclosed in JP 2016-175103 A uses, for example, a workpiece moving on a plane along a horizontal plane as a printing object and can acquire an angle between a longitudinal direction of a marking head and a movement direction of the workpiece and correct a print pattern based on the acquired angle and a moving speed of the workpiece.

On the other hand, JP 2008-044001 A discloses a laser marking apparatus (laser processing apparatus) capable of executing stationary printing.

The laser marking apparatus disclosed in JP 2008-044001 A uses, for example, a workpiece having a cylindrical shape as a printing object, and can arrange a print pattern on a cylindrical printing block and perform printing while adjusting a focus along such a cylinder.

Meanwhile, there is a case where printing is performed on a film or the like conveyed by a roller having a cylindrical shape, for example, instead of using a member having a cylindrical shape as the printing object. In this case, a workpiece, such as a film, is not always subjected to printing in a state of being in close contact with the roller. For example, printing on various portions, such as portions before and after being wound around the roller and a portion in close contact with the roller, is assumed.

In addition, it is necessary to assume various shapes respectively for portions, such as a cylindrical shape for the portion in close contact with the roller, and a planar shape inclined with respect to a horizontal plane for the portions before and after being wound by the roller, out of such a workpiece.

In regard to such an assumption, the conventional moving printing disclosed in JP 2016-175103 A assumes the workpiece moving along the substantially horizontal plane, and thus, is disadvantageous for use in a workpiece moving along a three-dimensional movement path, such as a cylindrical shape or a plane inclined with respect to the horizontal plane.

On the other hand, the conventional stationary printing as disclosed in JP 2008-044001 A assumes that printing is performed directly on a member having a three-dimensional shape, and thus, is still disadvantageous for use in a workpiece that moves by the operation of such a member.

SUMMARY OF THE INVENTION

The technology disclosed herein has been made in view of the above points, and an object thereof is to perform more appropriate printing on a workpiece moving along a three-dimensional movement path.

According to one embodiment of the disclosure, provided is a laser marking apparatus including: a laser light output section that generates laser light based on excitation light and outputs the laser light; a laser light scanning section that scans a surface of the workpiece with the laser light output from the laser light output section; a print data generation section that generates print data; and a marking control section that controls the laser light output section and the laser light scanning section based on the print data generated by the print data generation section to perform marking using the laser light on the workpiece arranged on a print surface.

Further, according to the one embodiment of the disclosure, the laser marking apparatus includes: a print pattern reception unit that receives an input of a print pattern that needs to be marked; and a print pattern correction section that corrects the print pattern received by the print pattern reception unit based on movement path information related to a movement path of the workpiece that moves with a change in a posture in a three-dimensional space, and the print data generation section generates the print data based on the print pattern corrected by the print pattern correction section.

Here, the workpiece as an object to be processed by the laser marking apparatus is not limited to a workpiece that is moving along the movement path. A workpiece stationary in the middle of the movement path can also be used as an object to be processed.

According to the one embodiment, the print pattern correction section performs the correction based on the movement path information when generating the print data. This movement path information corresponds to information related to a movement path of the workpiece moving while changing the posture in the three-dimensional space, that is, a three-dimensional movement path. Therefore, when the correction based on the movement path information is performed, more appropriate printing can be performed on the workpiece moving along the three-dimensional movement path.

In addition, according to another embodiment of the disclosure, the marking control section may have a function of acquiring movement information of the workpiece, and the marking control section may control the laser light scanning section based on a moving speed specified by the movement information of the workpiece such that a scanning line forming print data generated by the print data generation section follows the change in the posture accompanying the movement of the workpiece.

In addition, according to still another embodiment of the disclosure, the laser marking apparatus may include a display unit that displays a setting plane which is defined by an orthogonal coordinate system and associated with a scanning range by the laser light scanning section, and the print pattern reception unit may receive an input of the print pattern arranged on the setting plane displayed by the display unit.

In addition, according to still another embodiment of the disclosure, the workpiece may be a sheet-like flexible workpiece, and the movement path information may include movement path information related to a movement path of the flexible workpiece in a case where a conveyance support section, which sequentially supports different positions of the flexible workpiece and changes a posture of the flexible workpiece along the movement path of the flexible workpiece, is present within a scanning range by the laser light scanning section.

In addition, according to still another embodiment of the disclosure, the laser marking apparatus may include a path information reception unit that receives an input of the movement path information, and the print pattern correction section may correct the print pattern based on the movement path information received by the path information reception unit.

According to the still another embodiment, the laser marking apparatus can receive the input of the movement path information from the outside, for example. In general, the movement path of the workpiece has various forms depending on a shape of the workpiece, processing equipment of the workpiece, and the like. Therefore, it is possible to execute correction suitable for each of the forms of the movement path by adopting the configuration in which the input of the movement path information can be received.

In addition, according to still another embodiment of the disclosure, the laser marking apparatus may include a housing that accommodates the laser light output section and the laser light scanning section, the workpiece may be made of a sheet-like film placed around a conveyance roller and conveyed in a predetermined conveyance direction by rotation of the conveyance roller, the print surface may include at least one of; a first conveyance surface that extends while being inclined toward the conveyance roller; a second conveyance surface that is in contact with the conveyance roller and is curved to protrude in a direction approaching or separating from the housing; and a third conveyance surface that extends while being inclined to be separated from the conveyance roller, the first conveyance surface, the second conveyance surface, and the third conveyance surface being arranged in order from an upstream side in the conveyance direction, and the movement path information may include information related to the conveyance roller.

According to the still another embodiment, the print surface includes at least one of the first conveyance surface, the second conveyance surface, and the third conveyance surface. In this case, a three-dimensional shape of the movement path of the workpiece is characterized by information related to the conveyance roller, such as a shape of the conveyance roller and a relative positional relationship between the conveyance roller and the housing. Therefore, when the information related to the conveyance roller is used as the movement path information, it is advantageous in terms of implementing printing corresponding to the three-dimensional movement path.

In addition, according to still another embodiment of the disclosure, the movement path information may include a diameter of the conveyance roller.

According to the still another embodiment, the laser marking apparatus refers to the diameter of the conveyance roller as the movement path information. Such a configuration is advantageous in terms of implementing the printing corresponding to the three-dimensional movement path.

In addition, according to still another embodiment of the disclosure, the movement path information may include an inclination angle of at least one of the first and third conveyance surfaces with respect to the conveyance direction.

According to the still another embodiment, the laser marking apparatus refers to the inclination angle of at least one of the first and third conveyance surfaces as the movement path information. Such a configuration is advantageous in terms of implementing the printing corresponding to the three-dimensional movement path.

In addition, according to still another embodiment of the disclosure, the movement path information may include a distance between the housing and the conveyance roller in an irradiation direction from the housing toward the workpiece.

According to the still another embodiment, the laser marking apparatus refers to the distance between the housing and the conveyance roller as the movement path information. Such a configuration is advantageous in terms of implementing the printing corresponding to the three-dimensional movement path.

In addition, according to still another embodiment of the disclosure, an exit window that transmits the laser light to be scanned by the laser light scanning section may be formed in the housing, and the movement path information may include an offset amount of the conveyance roller in the conveyance direction with respect to a center line passing through a central portion of the exit window.

According to the above embodiment of the disclosure, the laser marking apparatus refers to the offset amount of the conveyance roller with respect to the exit window as the movement path information. Such a configuration is advantageous in terms of implementing the printing corresponding to the three-dimensional movement path.

In addition, according to still another embodiment of the disclosure, the print pattern correction section may correct a correspondence relationship between a scanning position of the laser light by the laser light scanning section and a control parameter of the laser light scanning section based on the movement path information, and the marking control section may control the laser light scanning section based on the corrected correspondence relationship such that the print pattern that needs to be marked is marked on the print surface.

According to the still another embodiment, the laser marking apparatus executes the correction based on the movement path information by correcting the correspondence relationship between the scanning position of the laser light and the control parameter of the laser light scanning section. Such a configuration is advantageous in terms of implementing the printing corresponding to the three-dimensional movement path.

As described above, the more appropriate printing can be performed on the workpiece moving along the three-dimensional movement path according to the disclosure.

and

Figure 13:
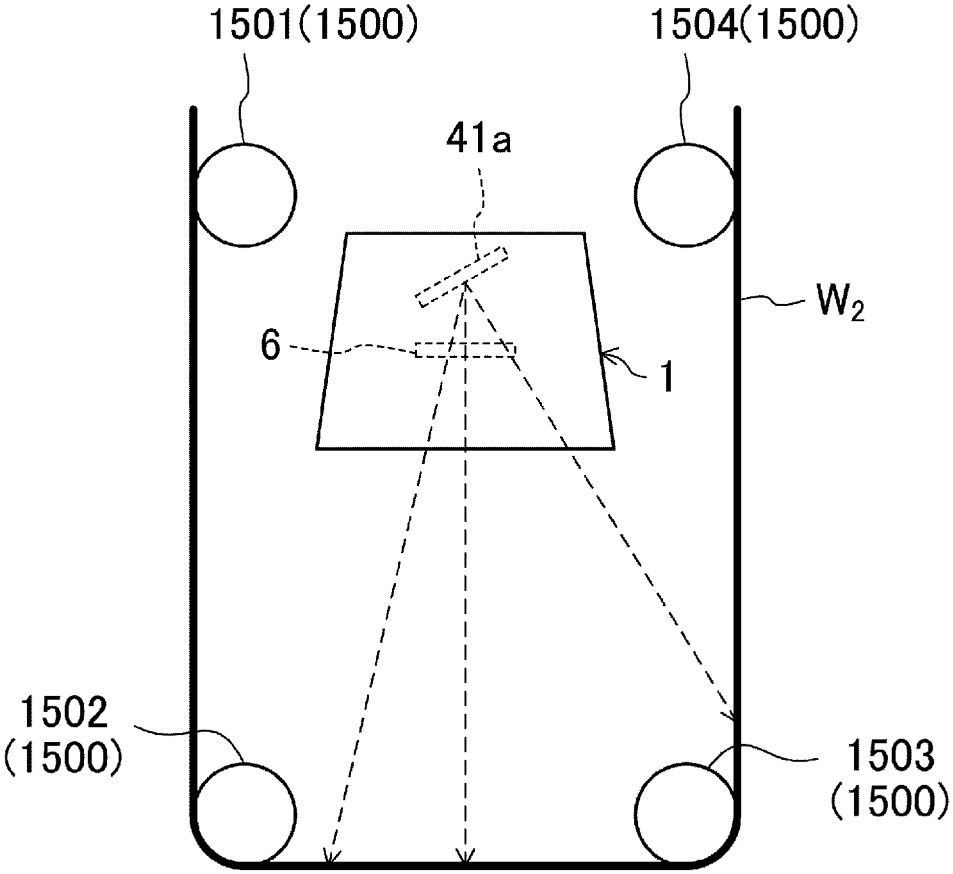

FIG. 13 is a diagram illustrating a specific example of another movement path.

DETAILED DESCRIPTION OF PREFERRED EMBODIMENTS

Hereinafter, an embodiment of the disclosure will be described with reference to the drawings. Note that the following description is given as an example.

That is, print processing (hereinafter, referred to as "marking" or may be simply referred to as "processing") will be described as a representative example of marking using laser light in this embodiment, but the disclosure can be applied to marking other than a character, such as marking of a figure.

<Overall Configuration>

Figure 1:
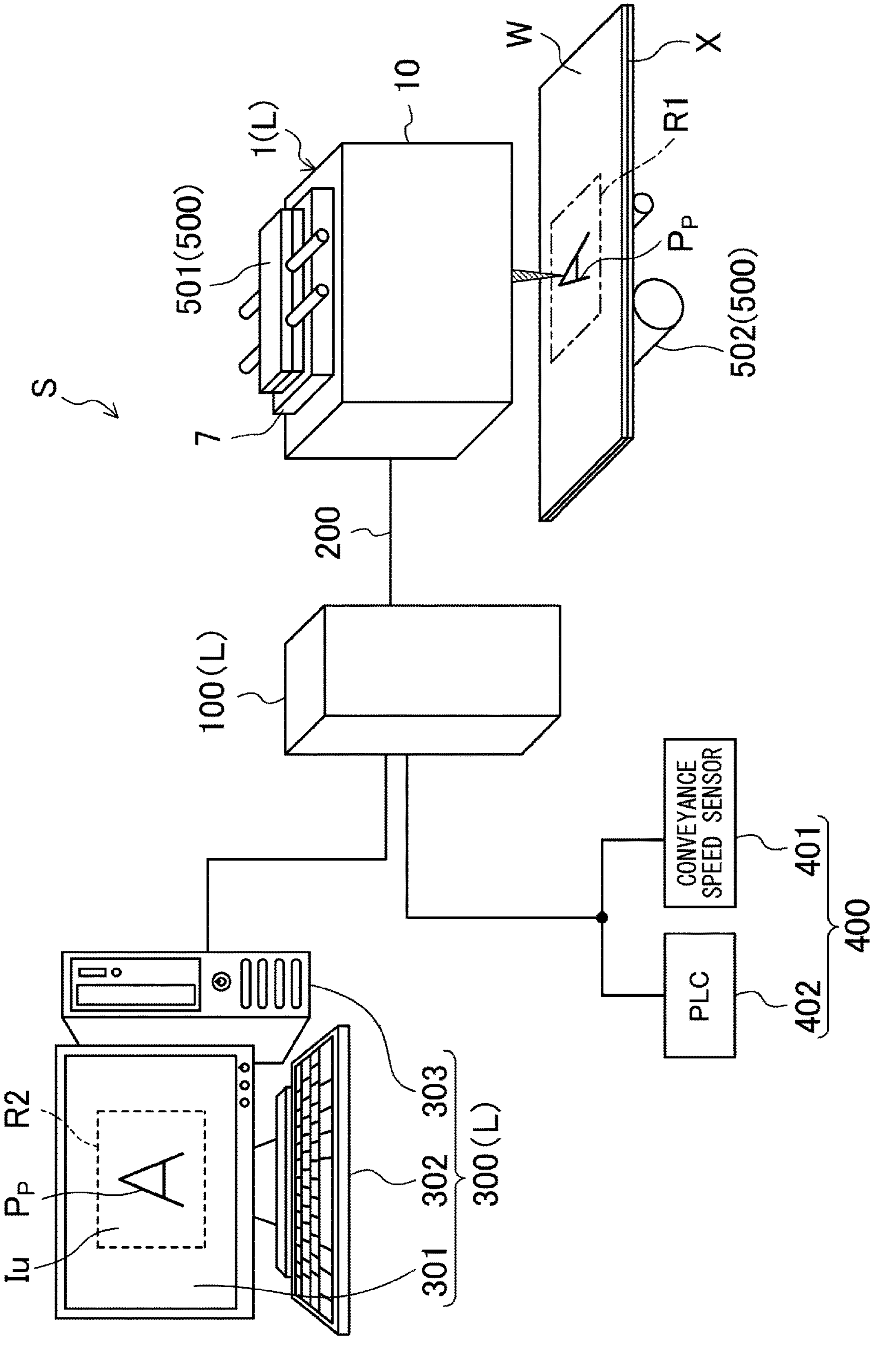
FIG. 1 is a diagram illustrating an overall configuration of a laser marking system.
Figure 2:
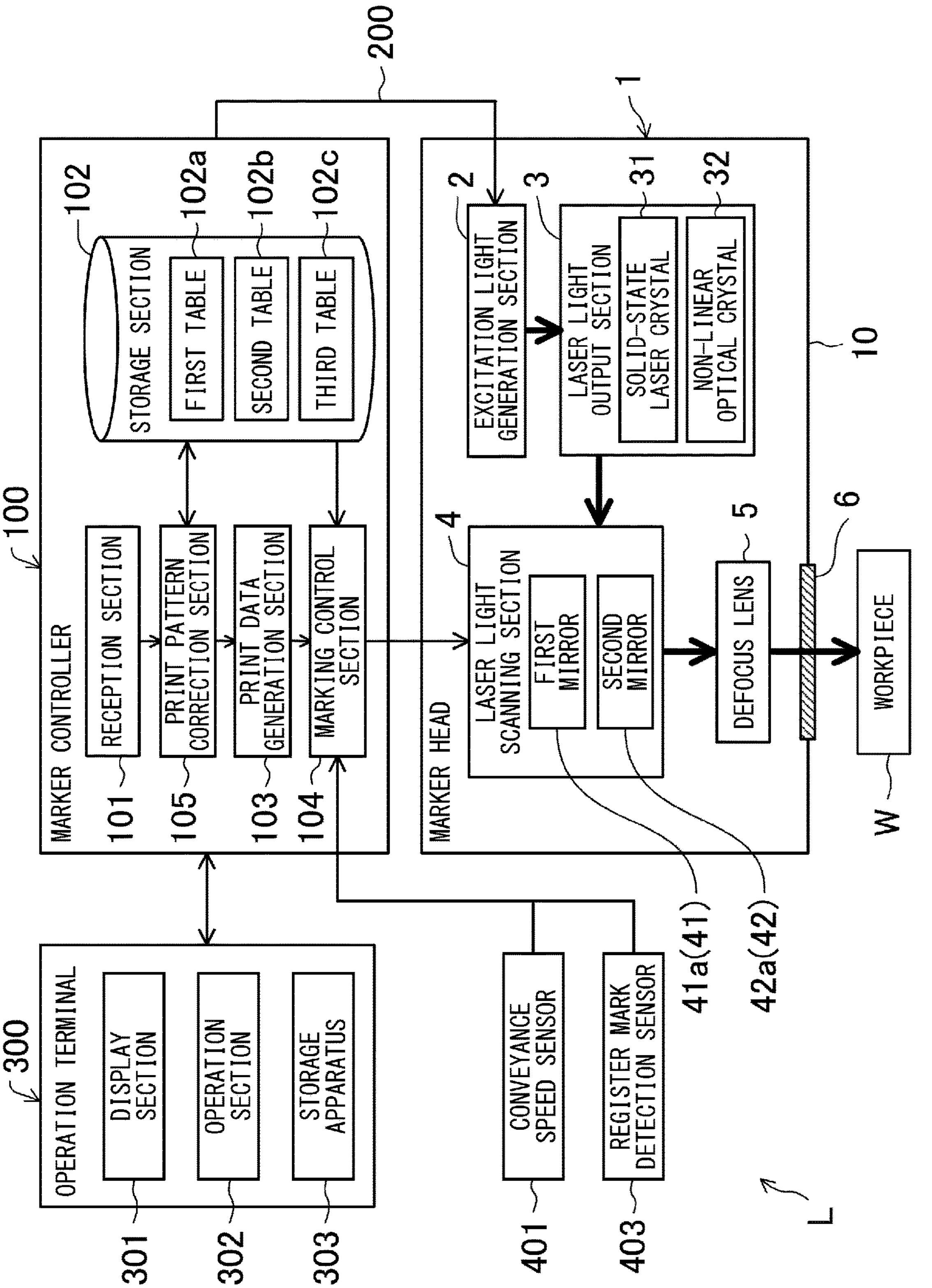
FIG. 2 is a block diagram illustrating a schematic configuration of a laser marking apparatus.
Figure 3:
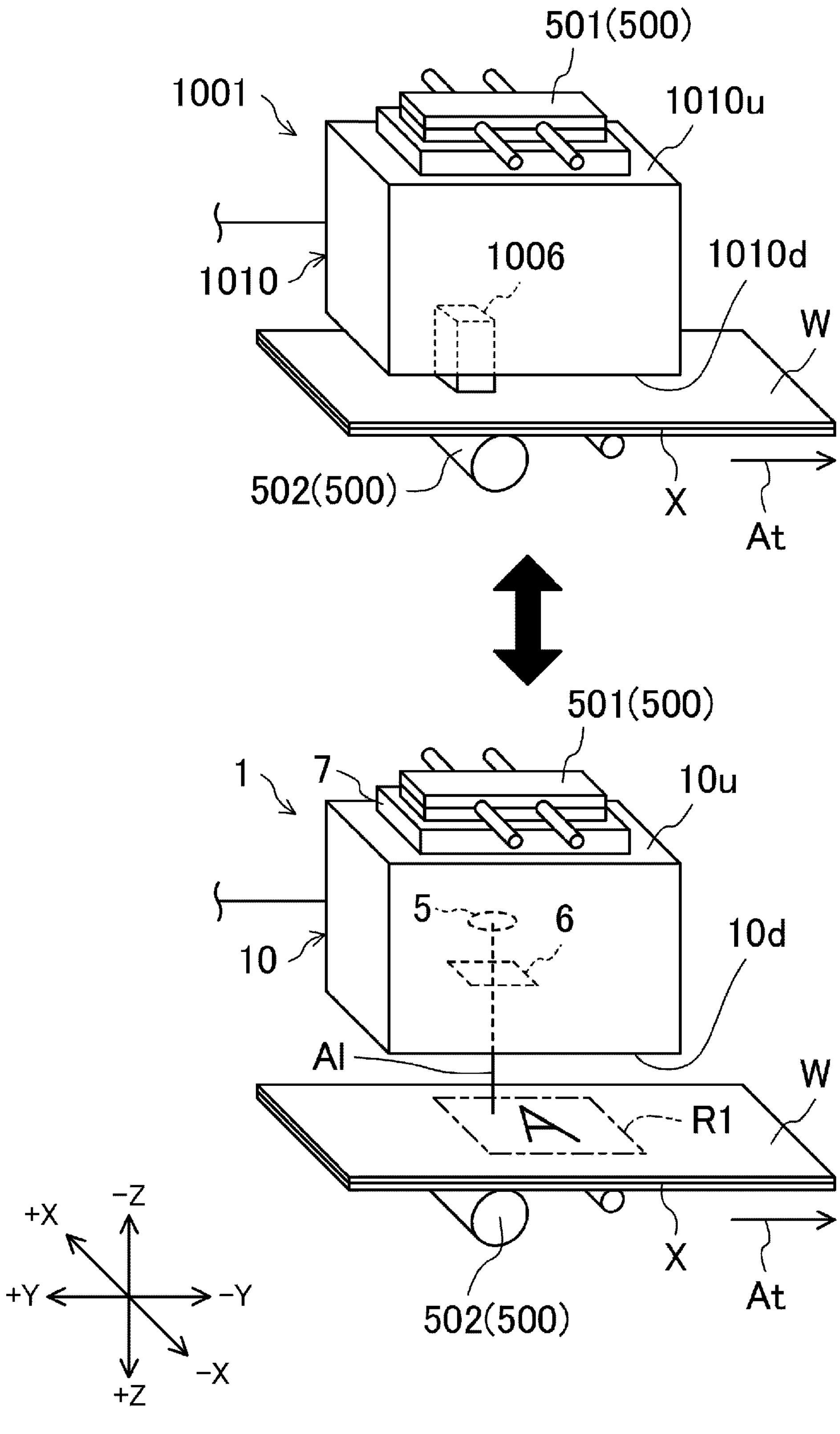
FIG. 3 is diagrams for describing replacement of a printing apparatus and a marker head.
Figure 4:
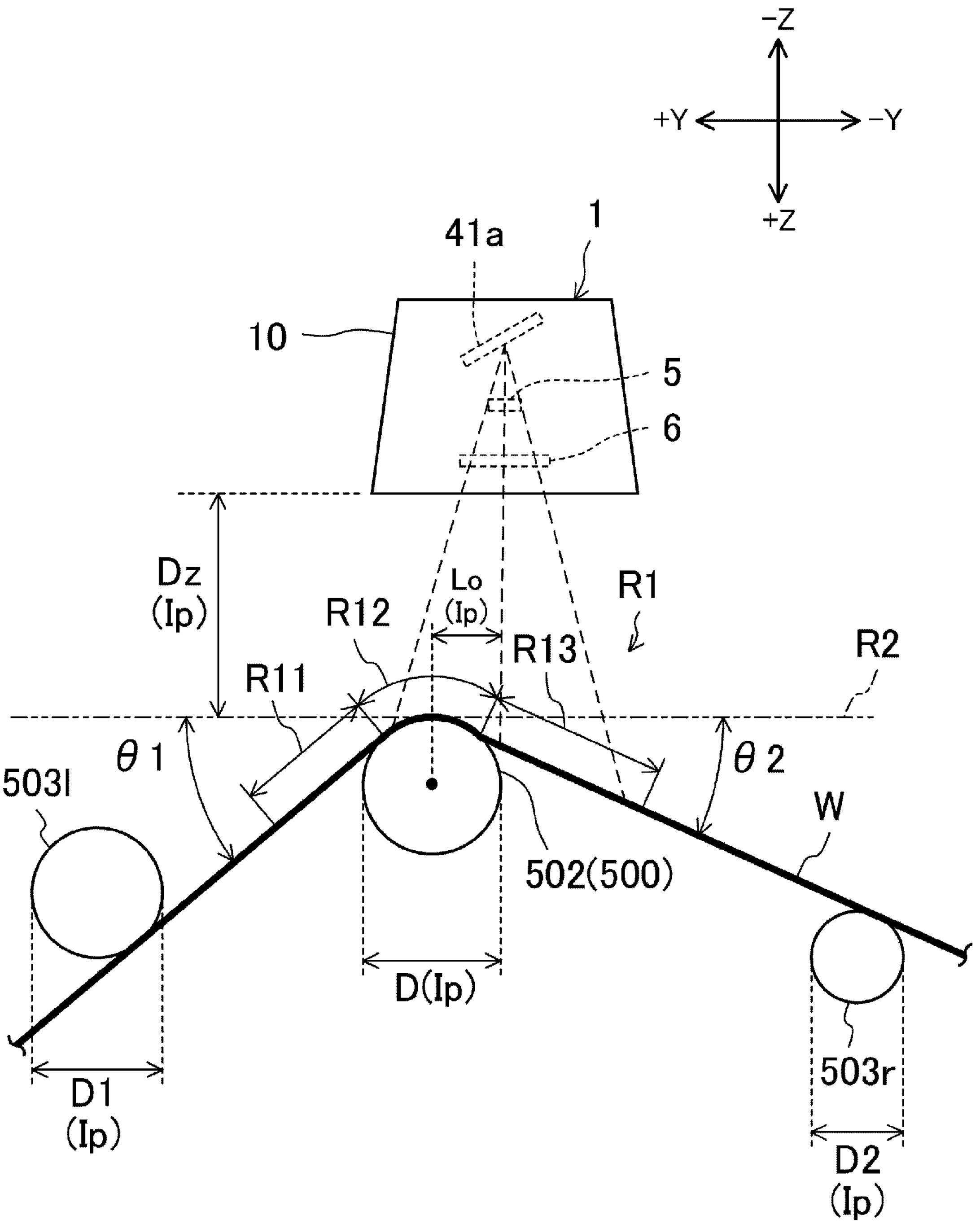
FIG. 4 is a diagram for describing a positional relationship between the marker head and a workpiece.

FIG. 1 is a diagram illustrating an overall configuration of a laser marking system S, and FIG. 2 is a diagram illustrating a schematic configuration of a laser marking apparatus L in the laser marking system S. In addition, FIG. 3 is a diagram for describing replacement between a printing apparatus 1001 and a marker head 1, and FIG. 4 is a diagram for describing a positional relationship between the marker head 1 and a workpiece W.

The laser marking system S illustrated in FIG. 1 includes the laser marking apparatus L, an external device 400 connected thereto, and a processing equipment 500 to which the laser marking apparatus L is attached and which conveys a workpiece W. Among these, the laser marking apparatus L illustrated in FIGS. 1 and 2 is configured to perform marking corresponding to a predetermined print pattern Pp on the workpiece W by irradiating a predetermined irradiation area R1 with laser light.

Note that the irradiation area R1 referred to herein is an area set on the surface of the workpiece W, and is an area corresponding to a print surface associated in advance with a setting plane R2 to be described later. The irradiation area R1 as the print surface can take various forms in accordance with a relative positional relationship between the laser marking apparatus L and the workpiece W, specifications of the laser marking apparatus L, a movement path of the workpiece W, and the like. The irradiation area R1 according to this embodiment is configured as a rectangular area as illustrated in FIG. 1. In addition, the setting plane R2 referred to herein corresponds to a virtual plane that extends along an XY plane (whose detailed definition will be described later) defined with a housing 10 as a reference and can be displayed on a display section 301.

For example, the irradiation area R1 of the workpiece W moving along a two-dimensional plane, particularly a horizontal direction, is a plane extending flat along the horizontal direction. On the other hand, the irradiation area R1 of the workpiece W moving in a three-dimensional space, particularly in a space inclined or curved with respect to the horizontal direction can be a plane inclined with respect to a horizontal plane or a curved surface curved with respect to the horizontal plane. As illustrated in FIGS. 1 and 3, for example, the irradiation area R1 according to this embodiment has a form in which the two-dimensional plane is inclined in a height direction. That is, the workpiece W according to this embodiment is configured to move in the three-dimensional space.

In addition, the print pattern Pp in the following description includes not only a pattern of a character that needs to be marked on the workpiece W but also a pattern of a figure that need to be marked on the workpiece W, such as ":", "x", a bar code, or a QR code (registered trademark).

In particular, the laser marking apparatus L according to this embodiment can emit laser light having a wavelength near 350 nm as the laser light for processing the workpiece W. This wavelength is included in a wavelength range of ultraviolet rays. Therefore, the laser light for processing the workpiece W is sometimes referred to as "UV laser light" to be distinguished from other laser light such as near-infrared rays in the following description. Note that laser light other than the ultraviolet rays such as infrared rays may be used for processing the workpiece W.

Hereinafter, a case will be described in which the workpiece W made of a sheet-like film is set as an object to be marked, and the film contains a UV-reactive layer X that chemically reacts with UV laser light. The workpiece W may be, for example, a sheet-like flexible workpiece.

However, the workpiece W that can be used as an object to be marked in the disclosure is not limited to the workpiece W formed of the sheet-like film containing the UV-reactive layer X. A film that chemically reacts with laser light having a wavelength other than the ultraviolet ray may be used, or the workpiece W made of various materials, such as a plastic film, a film containing an aluminum layer, a film containing an aluminum vapor deposition layer, and a film containing a paper layer, may be used as the object to be marked. In addition, the workpiece W may have a three-layer structure including a surface layer, the UV-reactive layer, and a sealant layer. In the three-layer structure, the UV-reactive layer is sandwiched between the surface layer and the sealant layer. As the surface layer, for example, polybutylene terephthalate (PBT), stretched PP (OPP), or the like may be adopted. As the UV-reactive layer, for example, a layer containing titanium oxide may be adopted. As the sealant layer, for example, a polyolefin film or the like capable of hot melt adhesion may be adopted. In addition, another layer may be additionally provided to form a four-layer structure or a five-layer structure.

In addition, the laser marking apparatus L according to this embodiment is configured to perform so-called two-dimensional printing by performing two-dimensional scanning with laser light, but so-called three-dimensional printing can also be performed since the laser marking apparatus L is configured to have a deeper depth of focus than a conventional product. Therefore, the laser marking apparatus L can mark even the workpiece W conveyed along a three-dimensional movement path.

As illustrated in FIGS. 1 and 2, the laser marking apparatus L according to this embodiment includes a marker head 1, a marker controller 100, an electric cable 200, and an operation terminal 300.

Among these, the marker controller 100 can receive a setting related to the print pattern Pp, and is configured as a controller for controlling the marker head 1.

On the other hand, the marker head 1 can irradiate the irradiation area R1 with UV laser light by being controlled by the marker controller 100.

The marker head 1 and the marker controller 100 are separated from each other in this embodiment, and are connected by the electric cable 200. The electric cable 200 includes at least an electric wiring that transmits the electric power from the inside (specifically, a power supply section (not illustrated)) of the marker controller 100 to the outside. Specifically, the electric cable 200 according to this embodiment is configured by bundling the electric wiring for transmitting the electric power and a signal wiring for transmitting and receiving an analog signal, a digital signal, and the like.

The marker head 1 according to this embodiment is installed on the processing equipment 500 that processes the workpiece W (particularly, flexible workpiece) made of a sheet-like film. As illustrated in FIG. 3, the processing equipment 500 includes a support member 501 that supports the marker head 1 and a conveyance roller 502 around which the workpiece W is placed.

Among them, the support member 501 can attach the laser marking apparatus L, particularly a housing 10 of the marker head 1, to a predetermined attachment position as illustrated in FIG. 3. Although FIGS. 1 and 3 illustrate the support member 501 configured to suspend the housing 10 from above, the housing 10 may be supported from another direction such as a side.

Hereinafter, the front-rear direction of the housing 10 is regarded as an X direction, the left-right direction is regarded as a Y direction, and a height direction is regarded as a Z direction. Specifically, the depth side of the plane of the drawing of FIG. 3 in the X direction is regarded as a +X direction, and the front side of the plane of the same drawing is regarded as a −X direction. Similarly, the left side of the plane of the drawing of FIG. 3 in the Y direction is regarded as a +Y direction, and the right side of the plane of the same drawing is regarded as a −Y direction. Similarly, am upper side of the plane of the drawing of FIG. 3 in the Z direction is regarded as a −Z direction, and a lower side of the plane of the same drawing is regarded as a +Z direction. Hereinafter, the X and Y directions defined with the housing 10 as a reference may be referred to as a "horizontal direction", and the XY plane based on the housing 10 may be referred to as a "horizontal plane".

On the other hand, the conveyance roller 502 is formed in a cylindrical shape having a central axis extending in a lateral direction (front-rear direction to be described later) of the workpiece W. In this case, the workpiece W is conveyed in a longitudinal direction along a predetermined movement path by the rotation of the conveyance roller 502. Hereinafter, a movement direction of the workpiece W as viewed along an orthogonal coordinate system is referred to as a "conveyance direction", and reference sign "At" is attached to the conveyance direction. The conveyance direction At according to this embodiment coincides with the −Y direction.

As illustrated in FIG. 4, the processing equipment 500 further includes a first driven roller 5031 and a second driven roller **503*r* that are driven when the workpiece W is conveyed by driving of the conveyance roller 502 (only the second driven roller 503*r* is illustrated in FIGS. 1 and 3). The conveyance roller 502, the first driven roller 5031, and the second driven roller 503*r*** sequentially support different positions (respective portions) of the workpiece W as the flexible workpiece along the conveyance direction, thereby constituting a "conveyance support section" that changes a posture of the workpiece along the movement path of the workpiece W.

The first driven roller 5031 is arranged on the upstream side (+Y side in the Y direction) of the conveyance roller 502 in the conveyance direction At, and is arranged on the lower side (+Z side in the Z direction) of the conveyance roller 502 in the height direction. The sheet-like workpiece W comes into contact with a lower surface of the first driven roller 5031.

The second driven roller **503*r* is arranged on the opposite side (−Y side in the Y direction) of the first driven roller 5031 across the conveyance roller 502, and is arranged on the lower side (+Z side in the Z direction) of the conveyance roller 502 in the height direction. The sheet-like workpiece W comes into contact with an upper surface of the second driven roller 503*r***.

In this case, the irradiation area R1 as the print surface includes at least one of a first conveyance surface R11 that extends while being inclined toward the conveyance roller 502, a second conveyance surface R12 that is in contact with the conveyance roller 502 and is curved so as to protrude in a direction of approaching or separating from the housing 10; and a third conveyance surface R13 that extends while being inclined so as to be separated from the conveyance roller 502 in order from the upstream side in the conveyance direction (+Y side in the Y direction).

Note that the print surface according to this embodiment includes all of the first conveyance surface R11, the second conveyance surface R12, and the third conveyance surface R13, but the print surface may be configured using one or two of the first conveyance surface R11, the second conveyance surface R12, and the third conveyance surface R13 in accordance with the layout and specification of the marker head 1, the layout of the processing equipment 500, and the like.

The first conveyance surface R11 is, for example, an inclined surface extending toward the −Z side as proceeding toward the −Y side. The second conveyance surface R12 is, for example, a curved surface curved so as to protrude in the direction of approaching the housing 10, that is, toward the −Z side. The third conveyance surface R13 is, for example, an inclined surface extending toward the +Z side as proceeding toward the −Y side. The first conveyance surface R11 and the third conveyance surface R13 are both inclined with respect to the setting plane R2 extending along the XY plane.

Here, the processing equipment 500 according to this embodiment is shared between the marker head 1 according to this embodiment and the printing apparatus 1001 that performs printing using a scheme other than the marking using laser light as illustrated in the upper diagram and the lower diagram of FIG. 3.

That is, the marker head 1 according to this embodiment can be attached to the support member 501 of the processing equipment 500, configured to attach the printing apparatus 1001, instead of the printing apparatus 1001.

Examples of the printing apparatus 1001 that can be replaced with the marker head 1 include a thermal transfer overprinter (TTO), but can also be replaced with other printing apparatuses 1001.

As the printing apparatus 1001 that can be replaced with the marker head 1, for example, any printing apparatus provided with a housing 1010 that is formed in a substantially rectangular parallelepiped shape and includes a printing surface 1010*d* obtained by exposing a printing section 1006 in contact with a printing area on the workpiece W, and a connection surface 1010*u* different from the printing surface 1010*d* and connectable to the support member 501.

In this case, the marker head 1 is supported by the support member 501 connectable to the connection surface 1010*u* similarly to the printing apparatus 1001 as illustrated in the upper diagram and the lower diagram of FIG. 3. The marker head 1 thus supported irradiates the irradiation area R1 set so as to correspond to the printing area (area in contact with the printing section 1006 in the printing apparatus 1001) with UV laser light, thereby marking the workpiece W.

On the other hand, the operation terminal 300 includes, for example, a central processing unit (CPU) and a memory, and is connected to the marker controller 100 so as to be capable of transmitting and receiving an electrical signal in a wired or wireless manner.

Note that the operation terminal 300 is configured using a personal computer such as a desktop computer or a laptop computer in this embodiment, but the disclosure is not limited to such a configuration. For example, the operation terminal 300 may be configured using a dedicated terminal that is connectable to the laser marking apparatus L such as a touch panel console. In addition, the operation terminal 300 can be also integrated into the marker controller 100, for example.

The operation terminal 300 functions as a terminal configured to set various printing conditions, such as a size of a character, and indicate information related to marking on the workpiece W to a user. The operation terminal 300 includes a display section 301 configured to display information to the user, an operation section 302 that receives an operation input from the user, and a storage apparatus 303 configured to store various types of information.

The display section 301 can display the setting plane R2 defined by orthogonal coordinates and associated with a scanning range by the laser light scanning section 4. The display section 301 is an example of a "display unit" in this embodiment. In addition, an input interface Iu that receives an input of a character (print pattern Pp) that needs to be marked is arranged on the setting plane R2 displayed by the display section 301 as illustrated in FIG. 1. As will be described in detail later, the input interface Iu includes user interfaces, such as a frame indicating a range of the setting plane R2 and a figure indicating a position of the print pattern Pp on the setting plane R2, and can receive the input of the print pattern Pp based on an operation input to the operation section 302 and display a content of the received print pattern Pp on the setting plane R2. The input interface Iu is an example of a "print pattern reception unit" in this embodiment.

The input interface Iu can also receive an input of movement path information Ip related to the movement path of the workpiece moving with a change in the posture in the three-dimensional space, and is also an example of a "path information reception unit" according to this embodiment. Details of the input interface Iu as the print pattern reception unit and the path information reception unit will be described later.

Specifically, the display section 301 is configured using, for example, a liquid crystal display or an organic EL panel. When the operation terminal 300 is incorporated in the marker controller 100 or the touch panel console is used, a display screen provided on the marker controller 100 or the console can be used as the display section.

The operation section 302 can be configured using a keyboard and a pointing device. Here, the pointing device includes a mouse, a joystick, or the like. When the operation terminal 300 is incorporated in the marker controller 100 or the touch panel console is used, a switch, a button, or the like provided in the marker controller 100 or the console can be used as the operation section.

The operation terminal 300 configured as described above can set printing conditions in marking based on the operation input from the user. The printing conditions include a target output (laser power) of laser light, a scanning speed (scan speed) of the laser light on the workpiece W, and the like as well as details of the print pattern Pp.

The printing conditions set by the operation terminal 300 are output to the marker controller 100 and stored in the storage section 102 of the marker controller 100. The storage apparatus 303 in the operation terminal 300 may store the printing conditions as necessary.

The external device 400 is connected to the marker controller 100 as necessary. In the example illustrated in FIGS. 1 and 2, a conveyance speed sensor 401 and a programmable logic controller (PLC) 402 are provided as the external device 400.

The conveyance speed sensor 401 is configured using, for example, a rotary encoder, and can detect a conveyance speed of the workpiece W. The conveyance speed sensor 401 outputs a signal (detection signal) indicating a detection result to the marker controller 100. The marker controller 100 controls two-dimensional scanning or the like of laser light based on the detection signal input from the conveyance speed sensor 401.

The PLC 402 is configured using, for example, a microprocessor, and can input a control signal to the marker controller 100. The PLC 402 is used to control the laser marking system S according to a predetermined sequence.

In addition to the above-described devices and apparatuses, an apparatus configured to perform operation and control, a computer configured to perform various other processes, a storage apparatus, a peripheral device, and the like can be connected to the laser marking apparatus L in a wired or wireless manner.

<Marker Head 1>

As illustrated in FIG. 2, the marker head 1 includes an excitation light generation section 2, a laser light output section 3, and a laser light scanning section 4 as main components. The excitation light generation section 2 generates excitation light for exciting UV laser light based on electric power supplied from the marker controller 100 via the electric cable 200. The laser light output section 3 generates UV laser light based on the excitation light generated by the excitation light generation section 2 and outputs the UV laser light. The laser light scanning section 4 deflects the UV laser light output from the laser light output section 3 to scan the surface of the workpiece W with the UV laser light.

In addition, the marker head 1 also includes a housing 10 that accommodates the above-described constituent elements, that is, the excitation light generation section 2, the laser light output section 3, and the laser light scanning section 4. An exit window 6 that transmits the UV laser light scanned by the laser light scanning section 4 is formed in the housing 10. Although not described in detail, the housing 10 has a substantially rectangular parallelepiped outer shape, and includes an exit surface 10*d* on which the exit window 6 is formed, and an attachment surface 10*u* different from the exit surface 10*d* and connectable to the support member 501. The attachment surface 10*u* is connected to the support member 501 via an attachment 7.

The exit window 6 has an exit hole penetrating through the exit surface 10*d* of the housing 10 and a cover glass fitted in the exit hole. Although not described in detail, the cover glass can be formed in a rectangular shape corresponding to the shape of the irradiation area R1, for example, a rectangular shape that is substantially similar to the irradiation area R1 and has a smaller size than the irradiation area R1.

The housing 10 is also provided with a defocus lens 5, which is interposed between the laser light scanning section 4 and the exit window 6 and defocuses the UV laser light, therein. The defocus lens 5 can be configured using, for example, a biconcave lens, and is arranged coaxially with the exit window 6.

Hereinafter, central axes of the defocus lens 5 and the exit window 6 are collectively referred to as a "laser emission axis", which is denoted by reference sign Al (see FIG. 3). The laser emission axis Al extends substantially parallel to the Z direction.

(Excitation Light Generation Section 2) The excitation light generation section 2 is configured to receive electric power supplied from the marker controller 100 through the electric cable 200, and generate excitation light corresponding to the electric power. The excitation light generation section 2 according to this embodiment includes an excitation light source (not illustrated) including, for example, a laser diode (LD). Note that the excitation light generation section 2, particularly the excitation light source, is not necessarily accommodated in the housing 10, and may be accommodated in the marker controller 100.

(Laser Light Output Section 3)

The laser light output section 3 includes a solid-state laser crystal 31 that generates a fundamental wave based on excitation light, and a non-linear optical crystal 32 that generates UV laser light based on the fundamental wave generated by the solid-state laser crystal 31.

In this embodiment, rod-shaped Nd:$YVO_4$ (yttrium vanadate) is used as laser media constituting the solid-state laser crystal 31. Laser excitation light is incident from one end surface of the rod-shaped solid-state laser crystal 31, and laser light having a fundamental wavelength (so-called fundamental wave) is emitted from the other end surface (so-called unidirectional excitation scheme by end pumping). In this embodiment, the fundamental wavelength is set to 1064 nm. On the other hand, a wavelength of the excitation light is set to the vicinity of a center wavelength of an absorption spectrum of Nd:$YVO_4$ in order to promote stimulated emission. However, rare earth-doped YAG, YLF, $GdVO_4$, and the like, for example, can be used as other laser media without being limited to this example.

In addition, the non-linear optical crystal 32 according to this embodiment is configured by combining a first wavelength conversion element (not illustrated) that generates a second harmonic wave having a wavelength higher than the wavelength (fundamental wavelength) of the fundamental wave and a second wavelength conversion element (not illustrated) that generates a third harmonic wave having a higher wavelength than the second harmonic wave.

The second harmonic wave is obtained by doubling a frequency of the fundamental wave. The wavelength of the second harmonic wave is set to 532 nm in this embodiment. The second harmonic wave is obtained by tripling the frequency of the fundamental wave. A wavelength of the third harmonic wave is set to 355 nm in this embodiment, and is set to fall within the ultraviolet range.

In this embodiment, LBO ($LiB_3O_3$) is used as the first wavelength conversion element and the second wavelength conversion element. However, not limited to LBO ($LiB_3O_3$), various organic non-linear optical materials, inorganic non-linear optical materials, and the like can be used as the first wavelength conversion element and/or the second wavelength conversion element.

The laser light scanning section 4 is configured using a so-called biaxial (X-axis and Y-axis) galvano scanner, and includes a first scanner 41 as a Y scanner and a second scanner 42 as an X scanner. In this embodiment, the second scanner 42 is arranged on the upstream side of an optical path of the UV laser light, and the first scanner 41 is arranged on the downstream side of the optical path of the UV laser light.

The first scanner 41 includes a first mirror 41*a* that reflects the UV laser light generated by the laser light output section 3. A deflection direction of the UV laser light by the first scanner 41 coincides with the Y direction viewed in the same orthogonal coordinate system as the setting plane R2. As the first scanner 41 adjusts a rotation angle (hereinafter, also referred to as "Y angle") Oy of the first mirror 41*a*, an irradiation position of the UV laser light on the surface of the workpiece W can be scanned in the Y direction.

The second scanner 42 includes a second mirror 42*a* that reflects the UV laser light reflected by the first mirror 41*a*. A deflection direction of the UV laser light by the second scanner 42 coincides with the X direction viewed in the same orthogonal coordinate system as the setting plane R2. As the second scanner 42 adjusts a rotation angle (hereinafter, also referred to as "X angle") θx of the second mirror 42*a*, an irradiation position of the UV laser light on the surface of the workpiece W can be scanned in the X direction.

The laser light scanning section 4 drives the first mirror 41*a* and the second mirror 42*a* in accordance with print data created in advance, thereby polarizing the UV laser light generated by the laser light output section 3 so as to be emitted toward the irradiation area R1. The UV laser light deflected in this manner passes through the defocus lens 5 and the exit window 6 and is emitted to the irradiation area R1.

<Marker Controller 100>

As illustrated in FIG. 2, the marker controller 100 includes a reception section 101 that receives the setting of the printing conditions; the storage section 102 that stores the printing conditions; a print pattern correction section 105 that corrects the print pattern Pp included in the printing conditions; a print data generation section 103 that generates print data Dp based on the corrected print pattern Pp; and a marking control section 104 that controls the marker head 1 based on the print data Dp.

Note that one or more of these elements may be provided in the operation terminal 300 or the marker head 1. For example, the print data generation section 103 may be mounted in the operation terminal 300, or the marking control section 104 may be provided in the marker head 1.

(Reception Section 101)

The reception section 101 is configured to receive the printing conditions set through the operation terminal 300 and output the received printing conditions to the storage section 102 and/or the print data generation section 103.

Specifically, the reception section 101 according to this embodiment is electrically connected to the operation terminal 300, displays the setting plane R2 on the display section 301 as the display unit, and arranges the input interface Iu as the print pattern reception unit on the setting plane R2.

The reception section 101 reflects a content input through the input interface Iu to each of the printing conditions, and can output the printing condition after reflection to at least one of the storage section 102, the print data generation section 103, the marking control section 104, and the print pattern correction section 105.

The reception section 101 also arranges the input interface Iu as the path information reception unit on the display section 301. As described above, the movement path information Ip received by the input interface Iu includes information related to the movement path of the workpiece W moving in the three-dimensional space. The movement path information Ip may include, for example, movement path information related to a movement path of the workpiece W as the flexible workpiece in a case where the conveyance support section is present within the scanning range by the laser light scanning section 4.

For example, in a case where the processing equipment 500 as illustrated in FIGS. 1, 3, and 4 is used, the movement path information Ip includes information related to the conveyance roller 502. Specifically, the movement path information Ip according to this embodiment includes a diameter D of the conveyance roller 502 as the information related to the conveyance roller 502 (see FIG. 4). In addition, the movement path information Ip may include the diameter D1 of the first driven roller 5031, a diameter D2 of the second driven roller 503*r*, and the like (see FIG. 8).

In addition, the movement path information Ip may include a distance Dz between the housing 10, particularly a lower end of the housing 10, and the conveyance roller 502 in the irradiation direction (+Z direction) from the housing 10 toward the workpiece W as the information related to the conveyance roller 502 as illustrated in FIG. 4.

In addition, the movement path information Ip may include an offset amount Lo of the conveyance roller 502 in the conveyance direction with respect to a center line (the laser emission axis Al in FIG. 3) passing through a central portion of the exit window 6 as the information related to the conveyance roller 502 as illustrated in FIG. 4.

In addition, in a case where the irradiation area R1 includes the first conveyance surface R11, the third conveyance surface R13, and the like, the movement path information Ip includes an inclination angle of at least one of the first conveyance surface R11 and the third conveyance surface R13 with respect to the setting plane R2 or the conveyance direction. In the example illustrated in FIG. 4, a first inclination angle θ1 of the first conveyance surface R11 with respect to the setting plane R2 and a second inclination angle θ2 of the third conveyance surface R13 with respect to the setting plane R2 are exemplified as elements of the movement path information Ip.

(Storage Section 102)

The storage section 102 is configured to temporarily or continuously store the printing conditions received by the reception section 101, and output the stored printing conditions to the print data generation section 103, the marking control section 104, the display section 301, or the like if necessary.

Specifically, the storage section 102 according to this embodiment includes, for example, a non-volatile memory such as a hard disk drive (HDD) or a solid state drive (SSD), or a volatile memory, and can temporarily or continuously store data indicating print settings.

Meanwhile, a correspondence relationship, obtained by associating the rotation angle (Y angle θy) of the first mirror 41*a* with a Y coordinate on the setting plane R2 and the irradiation area R1, and associating the rotation angle (X angle θx) of the second mirror 42*a* with an X coordinate on the setting plane R2 and the irradiation area R1 is required in order to irradiate a desired position on the workpiece W with the UV laser light. Hereinafter, the X angle θx and the Y angle θy are collectively referred to as a "scanner angle (S angle)". In addition, the X coordinate and the Y coordinate are collectively referred to as "XY coordinates" as is well known.

In general, such a correspondence relationship can be calculated in advance based on optical design, but an individual difference may occur for each product of the laser marking apparatus L due to variations in products or the like. For example, even if the same XY coordinates are set as the irradiation position, there is a possibility that the S angle for achieving the irradiation position may vary depending on the individual difference. Hereinafter, the S angle based on the preliminary calculation is referred to as a "theoretical S angle", and the S angle affected by the individual difference is referred to as an "actual S angle".

Therefore, the storage section 102 according to this embodiment is configured to store a first table 102*a*, which is a lookup table (LUT) storing a correspondence relationship between XY coordinates and the S angle calculated in advance based on the optical design, that is, a correspondence relationship between the XY coordinates and the theoretical S angle, and a second table 102*b* which is a lookup table storing a correspondence relationship between the theoretical S angle and the actual S angle. It is possible to determine the actual S angle for irradiating predetermined XY coordinates with laser light by collating the first table 102*a* and the second table 102*b*.

In particular, in this embodiment, the storage section 102 is configured to store the first table 102*a* for the horizontal plane passing through each Z coordinate up to a predetermined distance (workpiece distance) at which a laser output is maintained from the lower end of the housing 10. This configuration contributes to determination of a third table 102*c* to be described later.

In addition, in a case where the movement path of the workpiece W is inclined or bent with respect to the setting plane R2, a deviation occurs between an irradiation position set on the setting plane R2 and an actual irradiation position on the print surface (irradiation area R1). This deviation is corrected by the print pattern correction section 105.

The print pattern correction section 105 according to this embodiment determines a correspondence relationship between the actual S angle and an XY coordinate system in a case where the irradiation area R1 is set along the XY plane, in other words, a two-dimensional coordinate system viewed along the irradiation area R1 although partially overlapping with the description to be described later. The storage section 102 is configured to store the correspondence relationship determined by the print pattern correction section 105 as the third table 102*c* which is a lookup table different from the first table 102*a* and the second table 102*b*.

Hereinafter, the two-dimensional coordinate system viewed along the irradiation area R1, in other words, the two-dimensional coordinate system along the surface of the workpiece W is referred to as an "actual XY coordinate system", and two-dimensional coordinates viewed in the two-dimensional coordinate system are referred to as "actual XY coordinates". The basis of the actual XY coordinate system is different at each point on the surface of the workpiece W. On the other hand, a two-dimensional coordinate system based on the marker head 1, that is, an XY coordinate system along the horizontal plane may be referred to as a "horizontal coordinate system", and XY coordinates viewed in the XY coordinate system may be referred to as "horizontal coordinates".

A correspondence relationship between XY positions viewed in the horizontal coordinate system and the actual S angle can be read by referring to the first table 102*a* and the second table 102*b*. Then, a correspondence relationship between the XY positions viewed in the actual XY coordinate system and the actual S angle can be determined by further referring to the third table 102*c*.

Figure 5A:
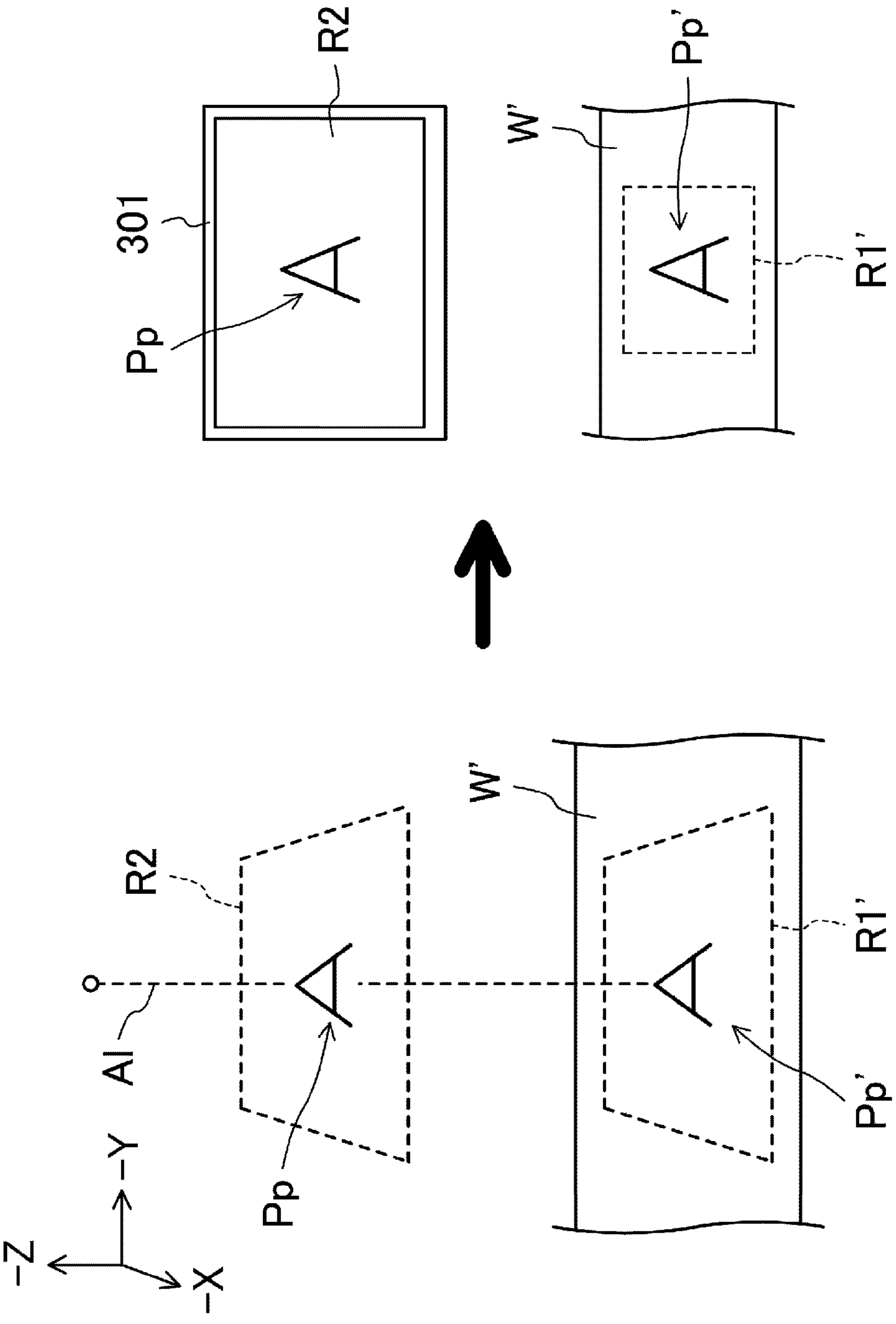
FIG. 5A is a diagram illustrating a print pattern in a case where a print surface extends parallel to a horizontal plane.
Figure 5B:
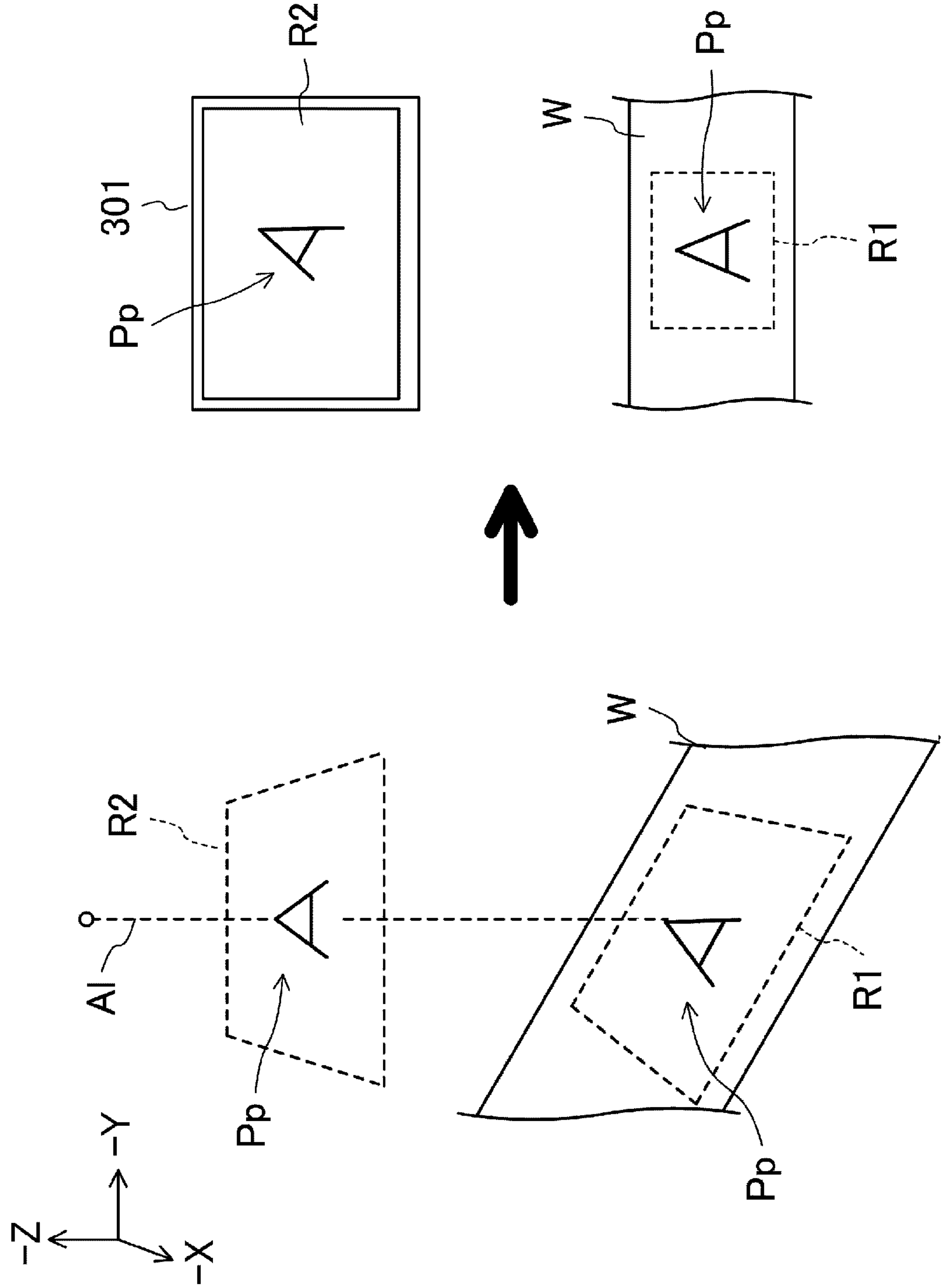
FIG. 5B is a diagram illustrating a print pattern in a case where the print surface extends obliquely to the horizontal plane.
Figure 5C:
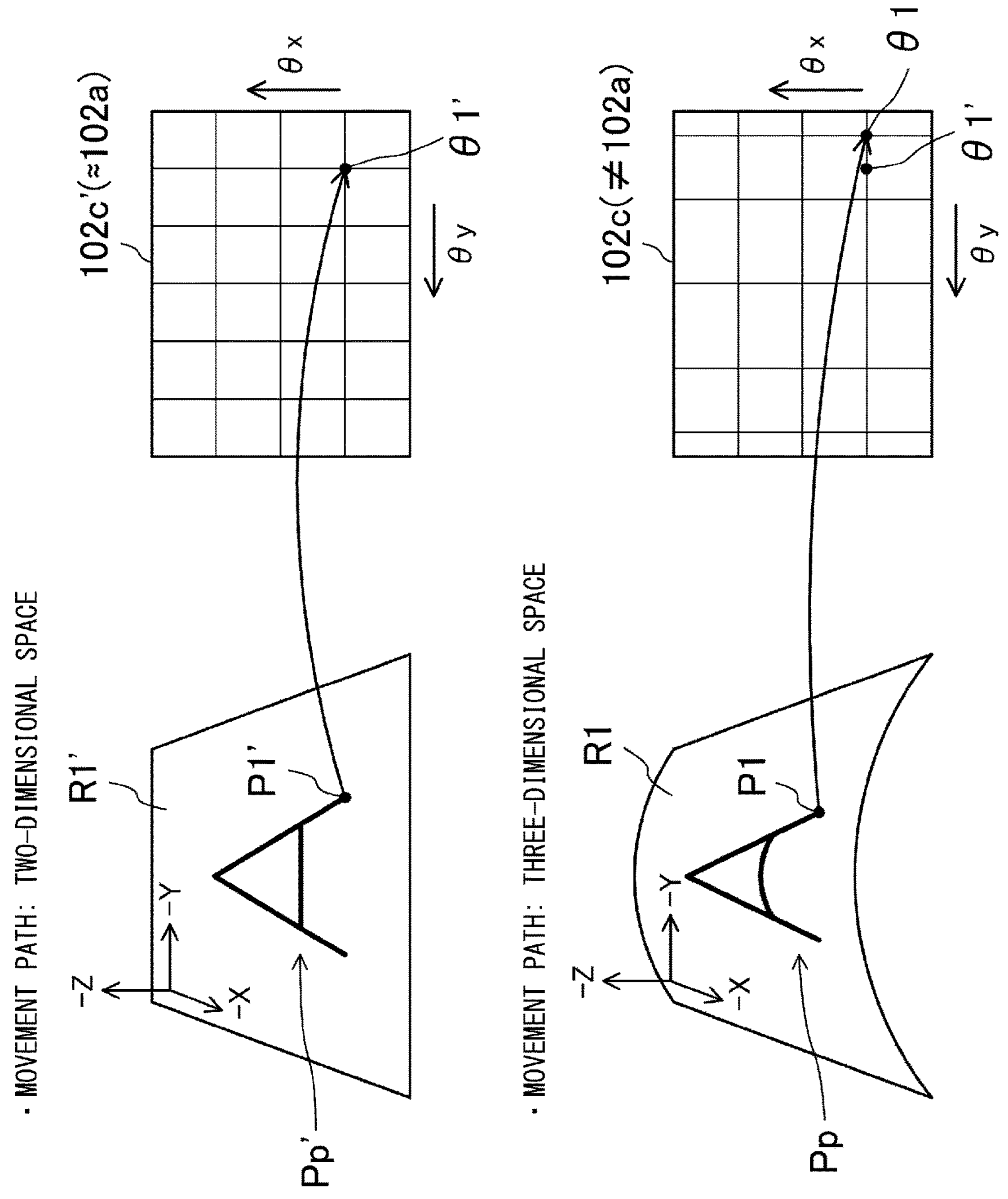
FIG. 5C is a diagram for describing correction by a print pattern correction section.

(Print Pattern Correction Section 105) FIG. 5A is a diagram illustrating a print pattern Pp' in a case where the print surface extends parallel to the horizontal plane, and FIG. 5B is a diagram illustrating the print pattern Pp in a case where the print surface extends obliquely to the horizontal plane. In addition, FIG. 5C is a diagram for describing correction by the print pattern correction section 105.

The print pattern correction section 105 is configured to correct the print pattern Pp based on the movement path information Ip received by the input interface Iu. Here, the print pattern correction section 105 may directly correct the print pattern Pp, or may indirectly and consequently correct the print pattern Pp by correcting a correspondence relationship between XY coordinates and the theoretical S angle or the actual S angle (determining an actual two-dimensional coordinate label and the theoretical S angle or the actual S angle). The print pattern correction section 105 according to this embodiment has a configuration employing the latter correction scheme.

That is, in a case where an irradiation area R1' as the print surface extends flat along the horizontal plane as illustrated in FIG. 5A, the print pattern Pp' received by the input interface Iu is marked on the irradiation area R1' of the workpiece W' without performing special processing. In this case, the print pattern Pp displayed on the setting plane R2 coincides with the print pattern Pp' to be actually marked.

On the other hand, in a case where the irradiation area R1 as the print surface extends obliquely to the horizontal plane as illustrated in FIG. 5B, the print pattern Pp received by the input interface Iu is different from the actual print pattern Pp to be actually marked on the irradiation area R1 unless special processing is performed.

In the case illustrated in FIG. 5A, the actual XY coordinate system coincides with the horizontal coordinate system. On the other hand, in the case as illustrated in FIG. 5B, the actual XY coordinate system is different from the horizontal coordinate system, and thus, when the desired print pattern Pp is achieved in the actual XY coordinate system, the print pattern Pp viewed along the horizontal coordinate system, that is, the setting plane R2 is distorted from the desired print pattern Pp as illustrated at the upper right of the plane of FIG. 5B.

In other words, the desired print pattern Pp is marked in the actual XY coordinate system by appropriately distorting (correcting) the print pattern Pp viewed on the setting plane R2.

Therefore, the print pattern correction section 105 according to this embodiment determines a correspondence relationship between actual XY coordinates and the actual S angle, and stores the correspondence relationship in the storage section 102 as the third table 102*c*.

The print pattern Pp received by the input interface Iu and the actual print pattern Pp to be actually marked on the irradiation area R1 can be made to coincide with each other by determining the actual S angle so as to obtain the desired print pattern Pp in the actual XY coordinate system.

In a case where the laser light scanning section 4 is controlled using the actual S angle determined so as to obtain the desired print pattern Pp in the actual XY coordinate system, the print pattern Pp viewed in the horizontal coordinate system is corrected and distorted from the desired print pattern Pp as illustrated at the upper right of the plane of FIG. 5B.

In this manner, the print pattern correction section 105 corrects a correspondence relationship between a scanning position of laser light by the laser light scanning section 4 and a control parameter (the actual S angle) of the laser light scanning section 4 based on the movement path information Ip. Specifically, the print pattern correction section 105 corrects a correspondence relationship with a scanning position viewed in the horizontal coordinate system into a correspondence relationship with a scanning position viewed in the actual XY coordinate system. As a result, the print pattern Pp is indirectly and consequently corrected from a form viewed in the horizontal coordinate system.

More specifically, in a case where the irradiation area R1' extends flat along the horizontal plane and the individual difference for each device is ignored as illustrated on the upper side of FIG. 5C, the first table 102*a* and the third table 102*c* substantially coincide with each other. In this case, an actual S angle θ1' for irradiating a lower end P1' of a character "A", which is the print pattern Pp', with laser light can be determined by referring to the first table 102*a*.

On the other hand, in a case where the irradiation area R1 extends to be curved with respect to the horizontal plane as illustrated on the lower side of FIG. 5C, the first table 102*a* and the third table 102*c* are different according to the movement path information Ip of the workpiece W. In this case, in a character "A" as the print pattern Pp, the actual S angle θ1 for irradiating the same lower end P1 as the lower end P1' with the laser light is different from the actual S angle θ1' obtained by referring to the first table 102*a*. The actual S angle θ1 in this case can be determined by referring to the third table 102*c*.

(Print Data Generation Section 103) The print data generation section 103 generates the print data Dp in association with the setting plane R2 defined by the orthogonal coordinates based on the print pattern Pp received by the user interface Iu as the character input unit.

Specifically, the print data generation section 103 according to this embodiment generates the print data Dp formed by arranging one or a plurality of scanning lines based on the print pattern Pp whose input has been received by the user interface Iu.

Note that the scanning line referred to herein indicates a trajectory of an irradiation position of UV laser light on the surface (particularly, the surface in the irradiation area R1) of the workpiece W. This scanning line is set so as to correspond to the print pattern Pp, and a shape of the scanning line changes in accordance with the print pattern Pp, and the number of scanning lines changes in accordance with a form and thickness of the character of the print pattern Pp. The print data Dp according to this embodiment includes data indicating the number of scanning lines and the shape of each of the scanning lines.

More specifically, the print data generation section 103 according to this embodiment is configured to generate the print data Dp based on the print pattern Pp directly or indirectly corrected by the print pattern correction section 105 after the input has been received by the user interface Iu.

When the print pattern Pp is indirectly corrected via the third table 102*c* as in this embodiment, a content of the print data Dp is the same whether the print pattern Pp is corrected or not corrected. That is, when the third table 102*c* is used, a shape of each scanning line is a shape viewed in the actual XY coordinate system, that is, the XY coordinate system in the case where the irradiation area R1 is set along the XY plane, but the shape itself of the scanning line is the same as that at the time when the correction is not performed. The same applies regarding the number of scanning lines.

Note that the shape of each scanning line can be determined by a spot position of laser light (irradiation position of laser light) viewed in the horizontal coordinate system or the actual XY coordinate system. The print data generation section 103 determines the irradiation position of the laser light viewed in the actual XY coordinate system for each scanning line, and configures the print data Dp by coordinate data indicating the irradiation position.

The print data Dp generated by the print data generation section 103 is stored in the storage section 102 or directly input to the marking control section 104.

(Marking Control Section 104)

The marking control section 104 is configured to perform marking using UV laser light on the workpiece W arranged on the irradiation area R1 as the print surface by controlling the laser light output section 3 and the laser light scanning section 4 based on the print data Dp generated by the print data generation section 103.

For example, when the print data Dp including a plurality of scanning lines is generated, the marking control section 104 reads the number of the scanning lines constituting the print data Df and a shape of each of the scanning lines. Further, the plurality of scanning lines are sequentially scanned one by one on the print surface according to a predetermined scan order (order of scanning each of the scanning lines).

Here, the marking control section 104 controls the laser light scanning section 4 based on the corrected correspondence relationship (third table 103*c*) between a scanning position (irradiation position) of laser light and the control parameter (actual S angle) of the laser light scanning section such that the print pattern Pp that needs to be marked is marked on the irradiation area R1 as the print surface.

Specifically, the marking control section 104 according to this embodiment refers to the third table 103*c* to determine the actual S angle corresponding to an irradiation position from the irradiation position of the laser light based on the shape of each of the scanning lines. The marking control section 104 can perform desired marking by controlling the laser light scanning section 4 so as to achieve the determined actual S angle.

<Regarding Main Processing and User Interface of Laser Marking Apparatus L>

Figure 6:
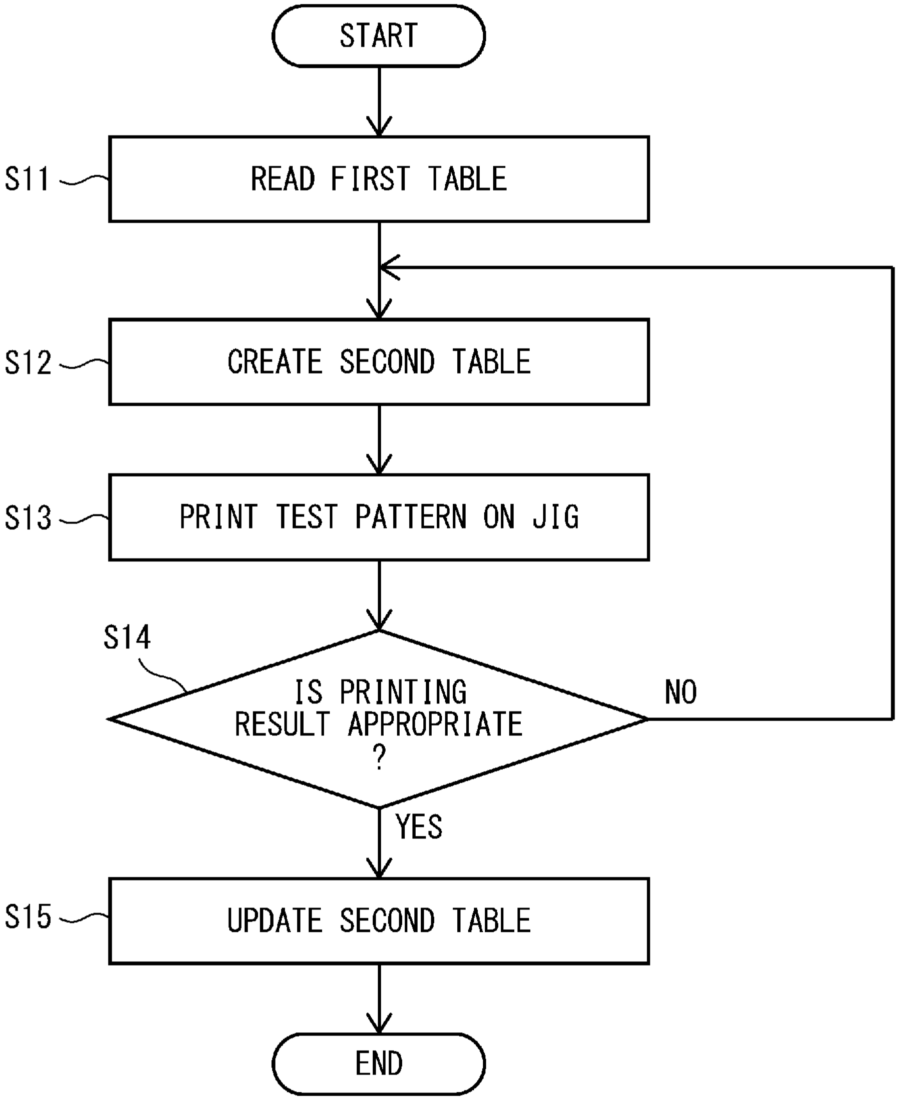
FIG. 6 is a flowchart illustrating an update procedure of a second table.
Figure 7:
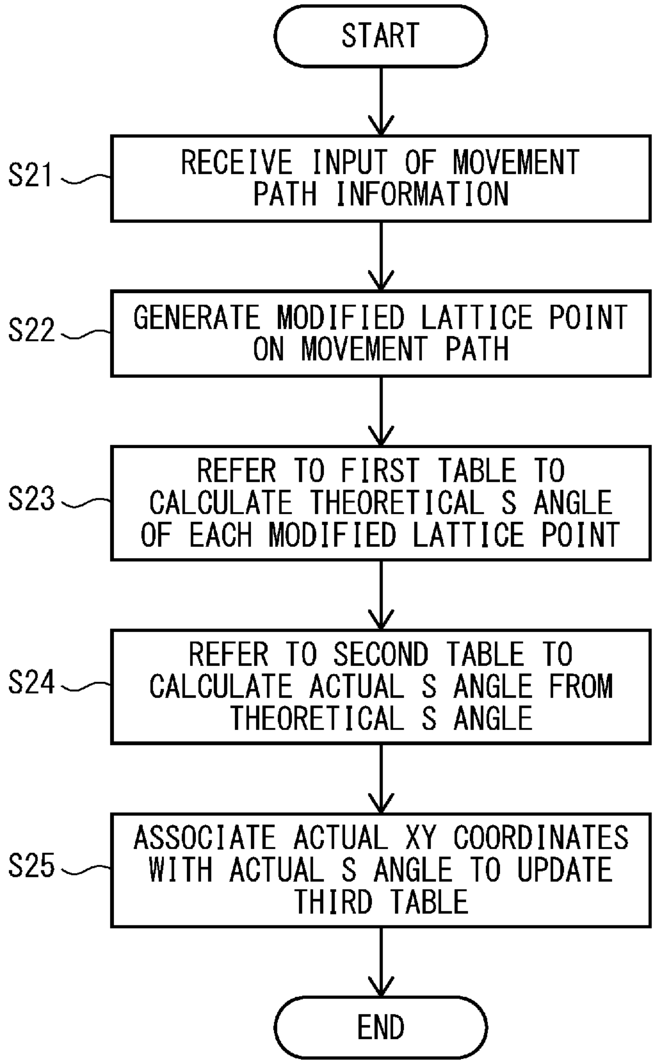
FIG. 7 is a flowchart illustrating an update procedure of a third table.
Figure 8:
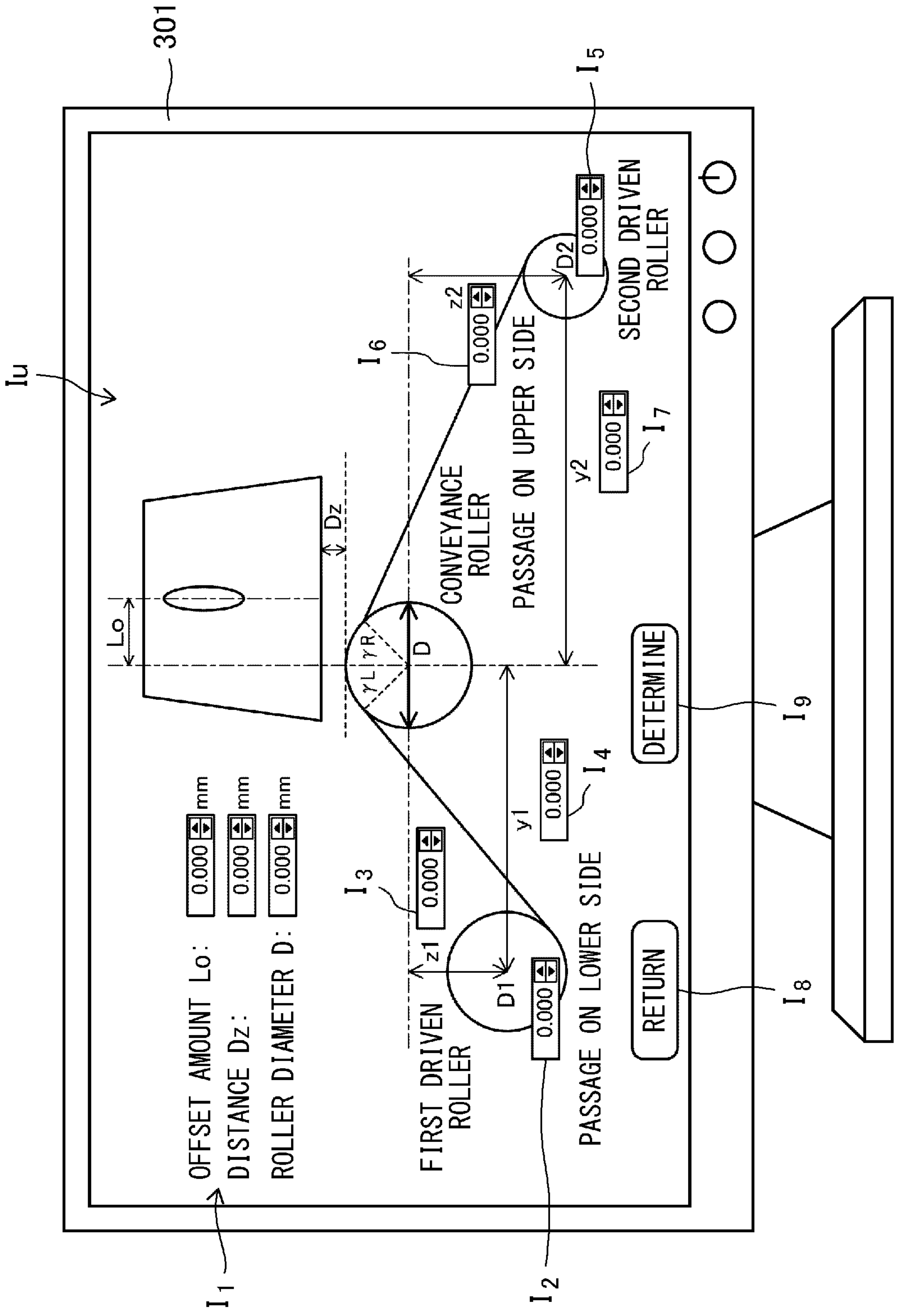
FIG. 8 is a diagram for describing a method of determining an actual S angle.
Figure 9:
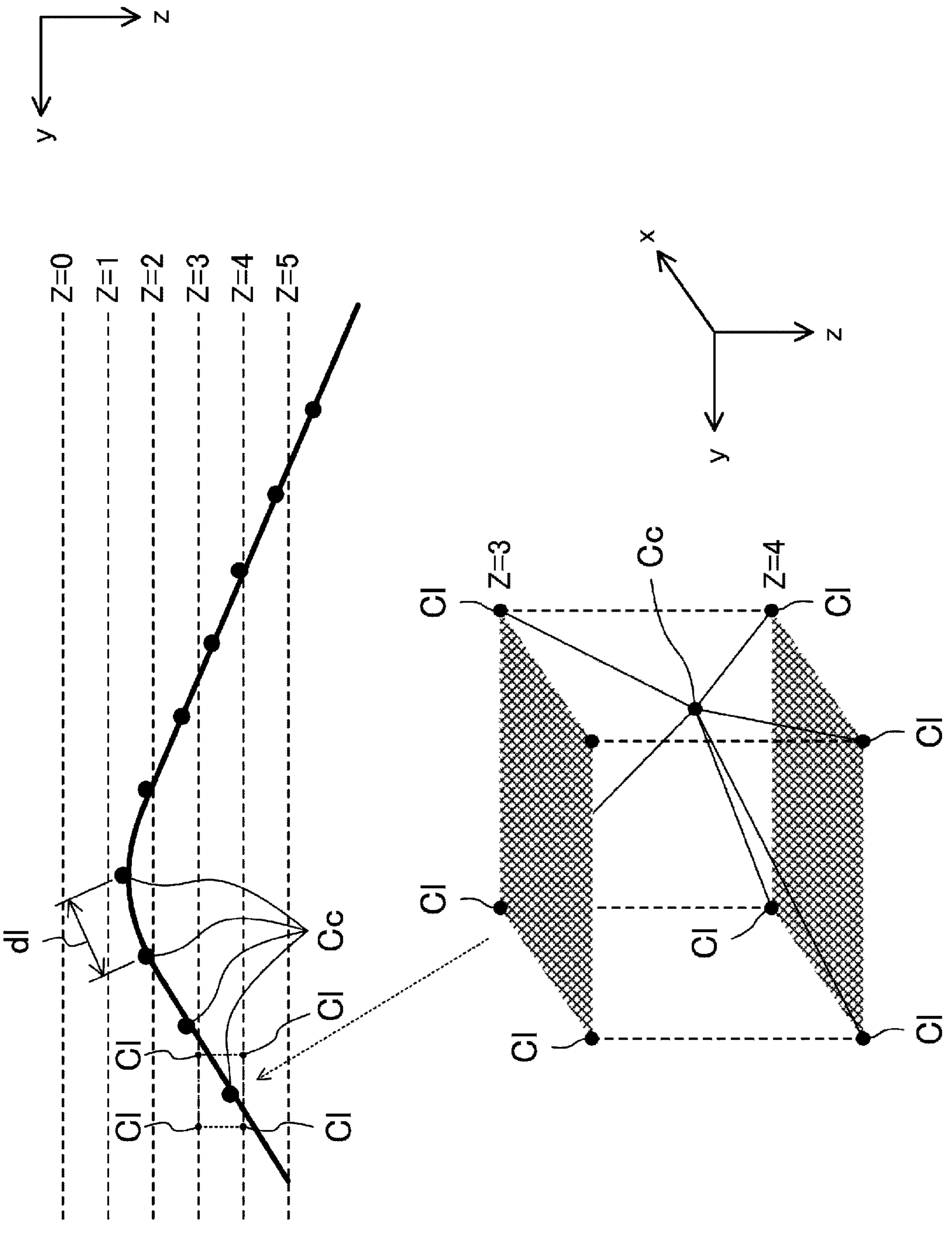
FIG. 9 is a diagram illustrating an input interface for movement path information.

FIG. 6 is a flowchart illustrating an update procedure of the second table 102*b*. In addition, FIG. 7 is a flowchart illustrating an update procedure of the third table 102*c*. FIG. 8 is a diagram for describing a method of determining the actual S angle. FIG. 9 is a diagram illustrating the input interface Iu of the movement path information Ip. The flows illustrated in FIGS. 6 and 7 are performed in advance before marking of the workpiece W by the laser marking apparatus L.

Figure 10:
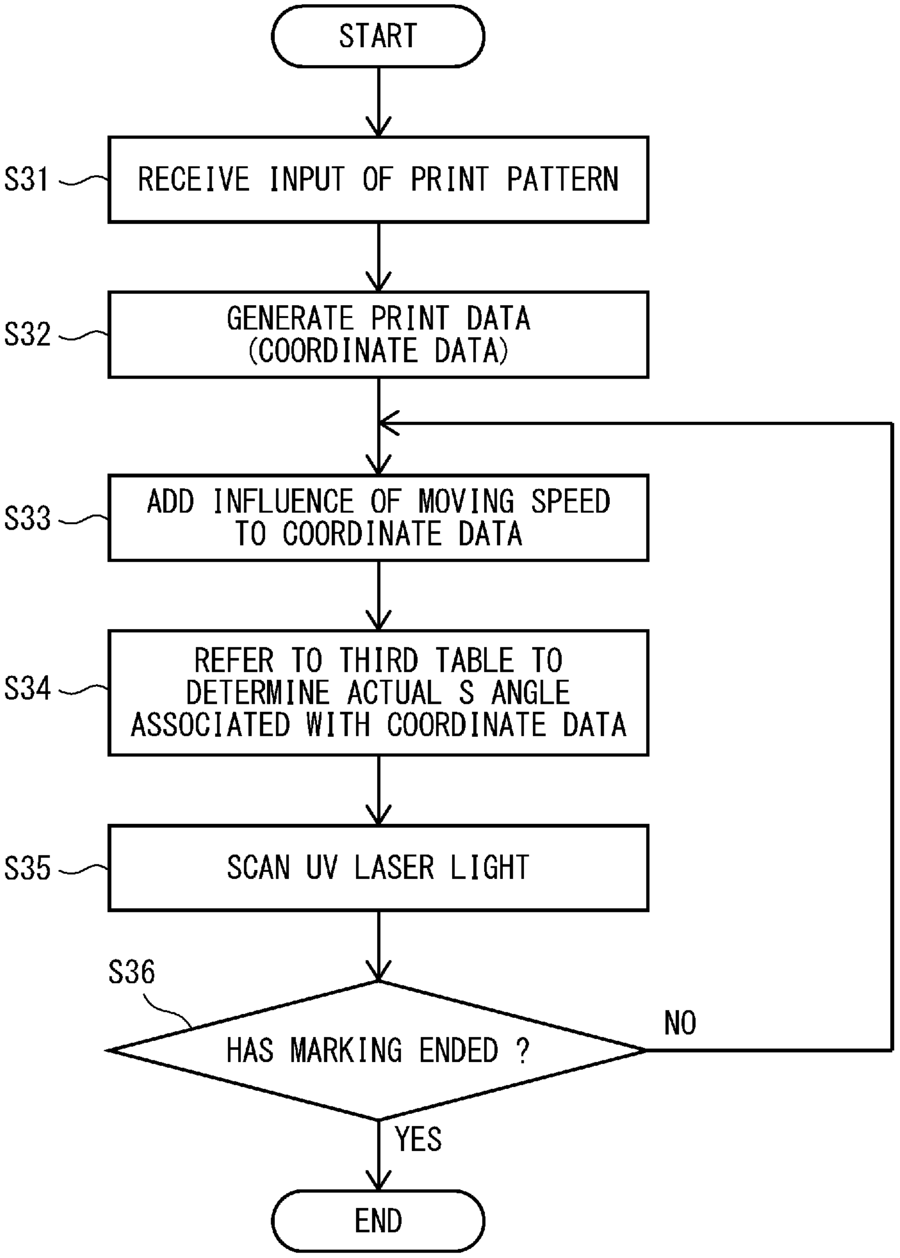
FIG. 10 is a flowchart illustrating a scanning procedure using a third table.
Figure 11:
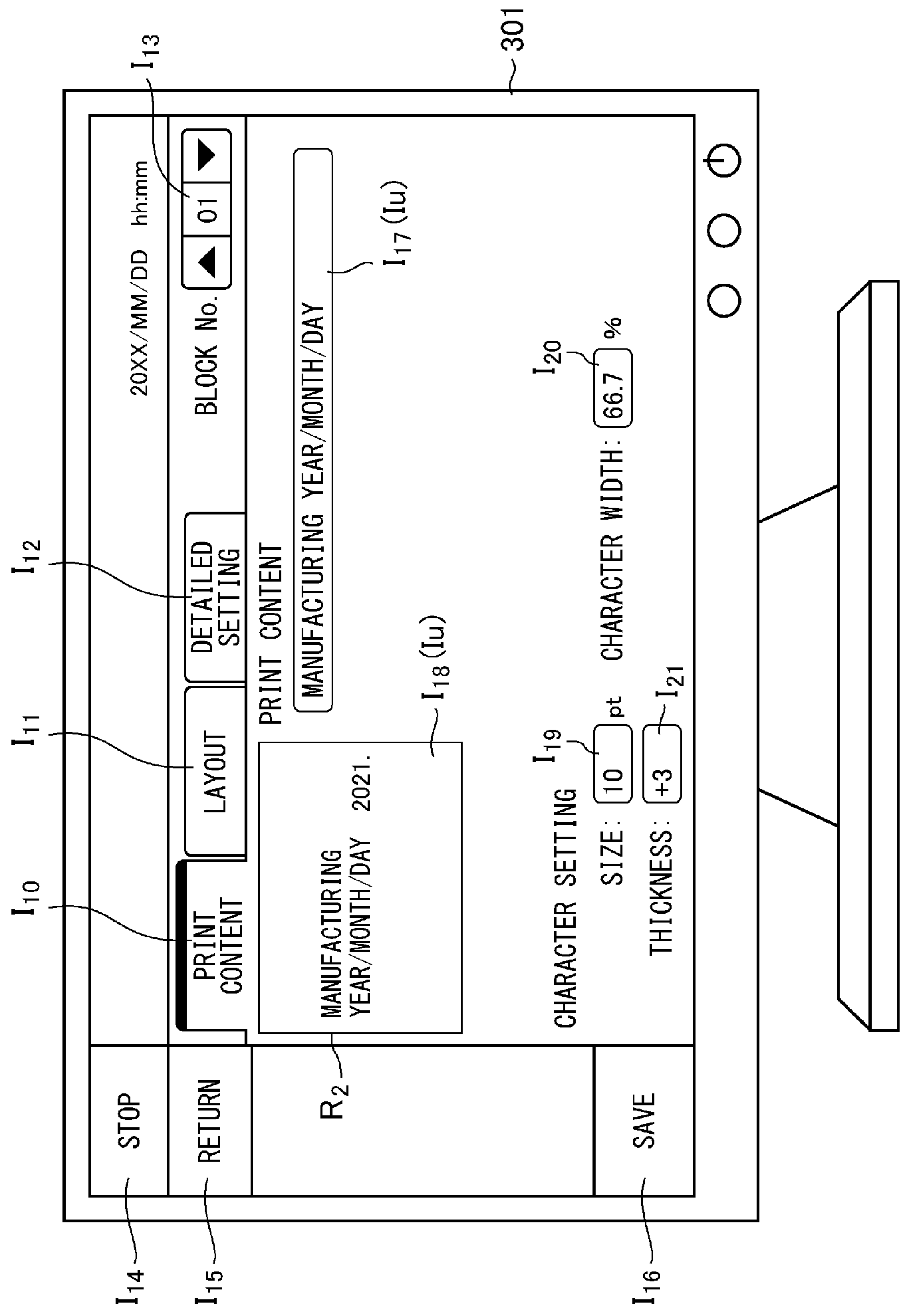
FIG. 11 is a diagram illustrating an input interface for the print pattern.
Figure 12:
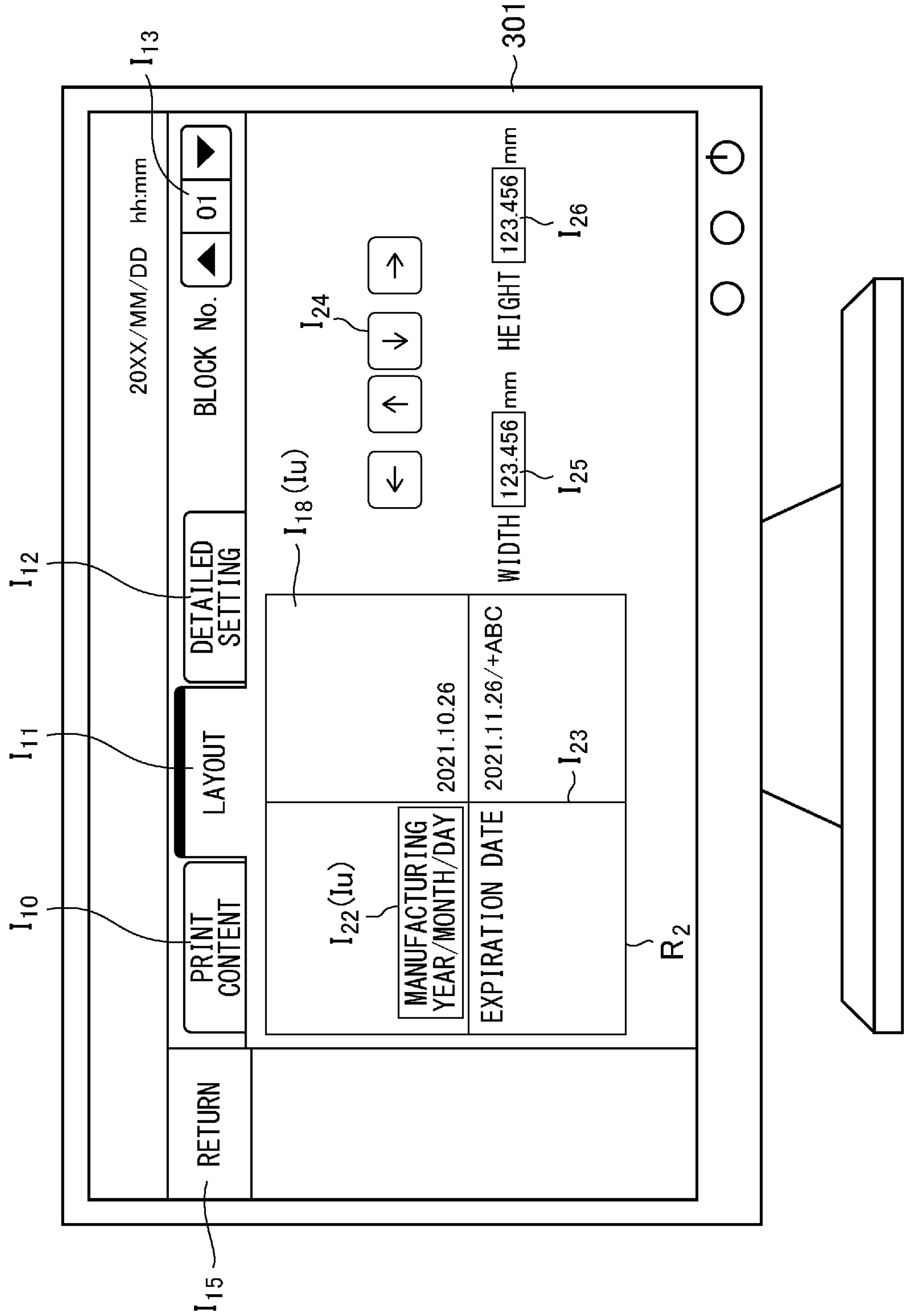
FIG. 12 is a diagram illustrating the input interface for the print pattern.

In addition, FIG. 10 is a flowchart illustrating a scanning procedure using the third table 102*c*. FIGS. 11 and 12 are diagrams illustrating the input interface Iu for the print pattern Pp. The flow illustrated in FIG. 10 is executed at the time of marking of the workpiece W by the laser marking apparatus L.

Hereinafter, the update procedures of the second table 102*b* and the third table 102*c*, the scanning procedure using the third table 102*c*, and a specific example of a user interface related to each of the procedures will be described with reference to the drawings.

(Preparation of First Table 102*a*)

As the first table 102*a*, what is determined by optical design is used. The first table 102*a* determined by the optical design is stored in advance in the storage section 102 or the like.

(Preparation of Second Table 102*b*)

The marker controller 100 executes the flow illustrated in FIG. 6 when preparing the second table 102*b*. First, in step S11 of FIG. 6, the marker controller 100 reads the first table 102*a*. In the subsequent step S12, the marker controller 100 creates the second table 102*b*.

In the subsequent step S13, the marker controller 100 causes the marker head 1 to emit laser light and causes a predetermined test pattern to be printed on a jig prepared in advance. As the jig, the workpiece W extending flat along the XY plane is selected.

In the subsequent step S14, the marker controller 100 determines whether or not the test pattern printed on the jig is appropriate, and then, returns to step S12 when the determination is NO, and proceeds to step S15 when the determination is YES.

In step S15, the marker controller 100 collates XY coordinates of an irradiation position with the actual S angle used to irradiate the irradiation position with the laser light for each irradiation position of the laser light on the test pattern.

Further, the marker controller 100 refers to the first table 102*a* to acquire the theoretical S angle corresponding to the XY coordinates that have been just collated. The marker controller 100 sequentially stores a correspondence relationship between the theoretical S angle acquired in this manner and the actual S angle that has been collated, thereby updating the second table 102*b*. This process can be performed using any inspection apparatus, such as a projector, an image inspection machine, or the like.

When the process illustrated in step S15 is completed, the marker controller 100 stores the updated second table 102*b* in the storage section 102, and ends the flow illustrated in FIG. 6.

(Preparation of Third Table 102*c*)

The marker controller 100 executes the flow illustrated in FIG. 7 when preparing the third table 102*c*. First, in step S21, the marker controller 100 arranges the input interface Iu that receives an input of the movement path information Ip on the display section 301.

In FIG. 8, the first interface $I_1$ is an interface that receives inputs of the offset amount Lo, the distance Dz, and the diameter D of the conveyance roller 502 described above in the movement path information Ip.

In addition, a second interface $I_2$ is an input field for inputting the diameter D1 of the first driven roller 5031, a third interface $I_3$ is an input field for inputting a deviation amount (z1) between a central axis of the conveyance roller 502 and a central axis of the first driven roller 5031 in the Z direction (height direction), and a fourth interface $I_4$ is an input field for inputting a deviation amount (y1) between the central axis of the conveyance roller 502 and the central axis of the first driven roller 5031 in the Y direction.

In addition, a fifth interface $I_5$ is an input field for inputting the diameter D2 of the second driven roller 503*r*, a sixth interface $I_6$ is an input field for inputting a deviation amount (z2) between the central axis of the conveyance roller 502 and a central axis of the second driven roller 503*r* in the Z direction (height direction), and a seventh interface $I_7$ is an input field for inputting a deviation amount (y2) between the central axis of the conveyance roller 502 and the central axis of the second driven roller 503*r* in the Y direction.

Further, an eighth interface $I_8$ is a button for returning to a setting screen before the input of the movement path information Ip, and a ninth interface $I_9$ is a button for confirming the input of the movement path information Ip.

The first interface $I_1$ to the ninth interface $I_9$ constitute the input interface (the path information reception unit) Iu in this embodiment, and are all configured to receive the input via the operation section 302.

In the subsequent step S22, the print pattern correction section 105 sets a movement path of the workpiece W based on the movement path information Ip input in step S21, and generates lattice points Cc at equal intervals (intervals dl) on the movement path.

In FIG. 9, broken lines indicated as Z=0, Z=1, and so on represent a horizontal coordinate system (general XY coordinate system) at each Z position.

Hereinafter, a coordinate system in which Z coordinates and the horizontal coordinate system are integrated (an XYZ coordinate system in a general sense) is also referred to as an "orthogonal coordinate system". In the orthogonal coordinate system, a simple cubic lattice can be set at equal intervals. Hereinafter, each lattice point forming the simple cubic lattice is referred to as a "simple lattice point", and is denoted by reference sign "Cl".

Here, in FIG. 9, each of the lattice points Cc arranged on the movement path corresponds a lattice point viewed in an XY coordinate system, that is, an actual XY coordinate system in a case where the movement path and the irradiation area R1 are set along the XY plane. Hereinafter, each of the lattice points Cc generated on the movement path may be referred to as a "modified lattice point" to distinguish from the simple lattice point Cl.

Note that actual XY coordinates can be set by numbering the respective modified lattice points Cc. For example, the N-th modified lattice point Cc from the left side along a left-right direction of the plane of FIG. 9 and the M-th modified lattice point Cc on the front side along a depth direction of the plane thereof can be regarded to exist at actual XY coordinates of (X, Y)=(N, M) as viewed in the actual XY coordinate system. In addition, each of the modified lattice points Cc is surrounded by a simple cubic lattice including eight simple lattice points Cl as illustrated in an enlarged manner in FIG. 9.

In the subsequent step S23, the print pattern correction section 105 calculates a theoretical S angle for irradiating one modified lattice point Cc with laser light based on orthogonal coordinates of the eight simple lattice points Cl surrounding the one modified lattice point Cc. Specifically, the print pattern correction section 105 refers to the first table 102*a* to acquire each of theoretical S angles corresponding to the orthogonal coordinates (horizontal coordinates +Z coordinate) of the eight simple lattice points Cl.

Further, the print pattern correction section 105 calculates a weighted average of the theoretical S angles corresponding to each set of the eight simple lattice points Cl, and regards a result of the calculation as the theoretical S angle corresponding to the one modified lattice point Cc. The print pattern correction section 105 calculates the theoretical S angle for each of the modified lattice points Cc.

In the subsequent step S24, the print pattern correction section 105 calculates an actual S angle from the theoretical S angle calculated in step S23 by referring to the second table 102*b* in order to consider variations caused by individual differences of apparatuses and the like. The print pattern correction section 105 calculates the actual S angle for each of the modified lattice points Cc.

In the subsequent step S25, the print pattern correction section 105 assigns the actual XY coordinates to each of the modified lattice points Cc as described above. The print pattern correction section 105 determines the third table 102*c* by associating the actual XY coordinates with the actual S angle calculated in step S24 for each of the modified lattice points Cc.

When the process illustrated in step S25 is completed, the print pattern correction section 105 stores the updated third table 102*c* in the storage section 102, and ends the flow illustrated in FIG. 7.

(Marking Procedure of Workpiece W)

The marker controller 100 executes the flow illustrated in FIG. 10 when marking the workpiece W. First, in step S31 of FIG. 10, the marker controller 100 displays the setting plane R2 on the display section 301, and arranges the input interface Iu that receives an input of the print pattern Pp on the setting plane R2. The marker controller 100 receives the input of the print pattern Pp via the input interface Iu. At this time, the marker controller 100 also receives other settings constituting the print data Dp, such as the thickness of the character.

In step S31, the display section 301 displays display screens as illustrated in FIGS. 11 and 12, for example. In FIGS. 11 and 12, a tenth interface $I_{10}$ is a switching tab for displaying an input screen on which the setting plane R2 is arranged in order to receive an input of a print content (the print pattern Pp). In addition, an eleventh interface $I_{11}$ is a switching tab for enlarging and displaying the setting plane R2 in order to receive position adjustment of the print pattern Pp, and a twelfth interface $I_{12}$ is a switching tab for displaying an input screen on which an input field and the like for inputting detailed settings of the print pattern Pp are arranged. FIG. 11 corresponds to a state in which the tenth interface $I_{10}$ is selected, and FIG. 12 corresponds to a state in which the eleventh interface $I_{11}$ is selected.

In addition, a thirteenth interface $I_{13}$ displayed on the upper right of the screen of FIG. 11 is a user interface for displaying an identification number (Block No.) allocated to a print block formed by grouping a plurality of the print patterns Pp and switching the print patterns Pp using the identification number.

In addition, a fourteenth interface $I_{14}$ displayed on the left side of the screen of FIG. 11 is a button for stopping the operation of the laser marking apparatus L, a fifteenth interface $I_{15}$ is a button for transitioning to an input screen of a setting item that needs to be determined at an earlier timing than the print pattern Pp, and a sixteenth interface $I_{16}$ is a button for saving a content of the print pattern Pp in the storage section 102 or the like.

In addition, a seventeenth interface $I_{17}$ displayed from the central portion to the right side of the screen in FIG. 11 is an input field that receives an input of the print content (print pattern Pp), and constitutes the input interface Iu in this embodiment. Although "manufacturing year/month/day" is input in this embodiment, but an input of a date such as an expiration date may be possible in a case of a food-related workpiece, for example.

In addition, an eighteenth interface $I_{18}$ configured using the setting plane R2 is displayed on the left side of the screen of the seventeenth interface $I_{17}$. The eighteenth interface $I_{18}$ functions as a display field for displaying the layout of the print pattern Pp, and constitutes the input interface Iu in this embodiment.

In addition, in FIG. 11, a nineteenth interface $I_{19}$ that receives an input of a character size of the print pattern Pp, a twentieth interface $I_{20}$ that receives an input of a character width of the print pattern Pp, and a twenty-first interface $I_{21}$ that receives an input of a thickness of the character constituting the print pattern Pp are displayed on the lower part of the screen of the eighteenth interface $I_{18}$.

Meanwhile, in FIG. 12, the eighteenth interface $I_{18}$ displayed to be enlarged from the state illustrated in FIG. 11 is displayed. A twenty-second interface $I_{22}$ indicating the print pattern Pp to be subjected to position adjustment and a twenty-third interface $I_{23}$ indicating a crosshair serving as a guideline for position adjustment are displayed in the eighteenth interface $I_{18}$ in FIG. 12. The twenty-second interface $I_{22}$ constitutes the input interface Iu in this embodiment.

In addition, in FIG. 12, a twenty-fourth interface $I_{24}$ for moving the printing block in the setting plane R2, a twenty-fifth interface $I_{25}$ for adjusting a width of the entire printing block, and a twenty-sixth interface $I_{26}$ for adjusting a height of the entire printing block are displayed on the right side of the screen of the eighteenth interface $I_{18}$.

Each of the tenth interface $I_{10}$ to the twenty-sixth interface $I_{26}$ is configured to receive an input via the operation section 302.

In subsequent step S32, the print data generation section 103 generates the print data Dp associated with the setting plane R2 based on the print pattern Pp received in step S31.

Here, the print data generation section 103 determines an irradiation position of laser light viewed in the actual XY coordinate system respectively for scanning lines, and generates the print data Dp as a set of pieces of coordinate data indicating the irradiation positions. The print pattern Pp viewed in the horizontal coordinate system is consequently corrected by determining the irradiation position of the laser light viewed in not the horizontal coordinate system but the actual XY coordinate system.

In the subsequent step S33, the marking control section 104 reads the coordinate data generated in step S32 and adds an influence of a moving speed of the workpiece W to the coordinate data.

Here, when the workpiece W is moving along the movement path, the marking control section 104 shifts the irradiation position of the laser light in the conveyance direction At based on the conveyance speed indicated by the detection signal of the conveyance speed sensor 401 (encoder or the like). A shift amount of the irradiation position is determined according to a level of the conveyance speed and the magnitude of an angle of the laser emission axis Al with respect to the irradiation position. Note that when the workpiece W is stationary on the movement path, the moving speed is regarded as zero. In this case, the coordinate data is not changed.

In addition, in a case where the workpiece W is a film, a register mark detection sensor 403 that detects a register mark affixed to the film may be provided. The marking control section 104 can recognize an appropriate printing timing for the moving film using a detection signal of the register mark detection sensor 403. Specifically, printing is performed at a timing when a predetermined time (printing delay) corresponding to a conveyance speed has elapsed after detection of the register mark (printing trigger) by the register mark detection sensor 403.

In a case where printing is performed on the moving workpiece W in this manner, the marking control section 104 may have a function of acquiring movement information of the workpiece. In this case, the marking control section 104 may control the laser light scanning section 4 such that the scanning line forming the print data generated by the print data generation section 103 follows the movement of the workpiece based on the moving speed specified by the movement information of the workpiece.

In addition, in a case where the thickness of the character constituting the print pattern becomes thick, a boldface printing process may be performed. The boldface printing process is a process of generating print data for boldface including a plurality of scanning lines arranged side by side in a direction in which a line element of a character that needs to be marked becomes thick. The marking control section 104 may control the laser light scanning section 4 to scan the laser light along an outer scanning line farther from a center line of the line element of the character corresponding to the print data for boldface than an inner scanning line prior to the inner scanning line closer to the center line of the line element of the character corresponding to the print data for boldface for the scanning lines adjacent to each other in the direction in which the line element becomes thick among the plurality of scanning lines forming the print data for boldface. Further, the above-described moving printing can be performed on such a boldface character.

In the subsequent step S34, the marking control section 104 refers to the third table 102*c* stored in the storage section 102 to determine an actual S angle associated with each piece of the coordinate data.

In the subsequent step S35, the marking control section 104 controls the laser light output section 3 to output UV laser light, and at the same time, controls the laser light scanning section 4 based on the actual S angle determined in step S34. As a result, the marking control section 104 can scan the UV laser light along a desired scanning line and perform marking on the surface of the workpiece W (particularly, the irradiation area R1 as the print surface).

In the subsequent step S36, the marking control section 104 determines whether or not all the scanning lines have been marked, and then, returns to step S33 when the determination is NO, and ends the flow illustrated in FIG. 10 when the determination is YES.

<Measure Against Three-Dimensional Movement Path>

As described above, the print pattern correction section 105 performs correction based on the movement path information Ip at the time of generating the print data Dp according to this embodiment (see FIGS. 5A, 5B and 5C). The movement path information Ip corresponds to a movement path of the workpiece W moving in a three-dimensional space, that is, information related to a three-dimensional movement path. Therefore, when the correction based on the movement path information Ip is performed, more appropriate printing can be performed on the workpiece W moving along the three-dimensional movement path.

In addition, the laser marking apparatus L can receive the input of the movement path information Ip from the outside, for example, as illustrated in FIG. 8. In general, the movement path of the workpiece W has various forms depending on a shape of the workpiece W, processing equipment of the workpiece W, and the like. Therefore, it is possible to execute correction suitable for each of the forms of the movement path by adopting the configuration in which the input of the movement path information Ip can be received.

In addition, the irradiation area R1 as the print surface includes at least one of the first conveyance surface R11, the second conveyance surface R12, and the third conveyance surface R13 as illustrated in FIG. 4. In this case, a three-dimensional shape of the movement path of the workpiece W is characterized by information related to the conveyance roller 502, such as a shape of the conveyance roller 502 and a relative positional relationship between the conveyance roller 502 and the housing 10. Therefore, when the information related to the conveyance roller 502 is used as the movement path information Ip, it is advantageous in terms of implementing printing corresponding to the three-dimensional movement path.

In addition, the laser marking apparatus L refers to the diameter of the conveyance roller 502 as the movement path information Ip as illustrated in FIG. 4. Such a configuration is advantageous in terms of implementing the printing corresponding to the three-dimensional movement path.

In addition, the laser marking apparatus L refers to the inclination angle (the first inclination angle θ1 and/or the second inclination angle θ2) of at least one of the first conveyance surface R11 and the third conveyance surface R13 as the movement path information Ip as illustrated in FIG. 4. Such a configuration is advantageous in terms of implementing the printing corresponding to the three-dimensional movement path.

In addition, the laser marking apparatus L refers to the distance Dz between the housing 10 and the conveyance roller 502 as the movement path information Ip as illustrated in FIG. 4. Such a configuration is advantageous in terms of implementing the printing corresponding to the three-dimensional movement path.

In addition, the laser marking apparatus L refers to the offset amount Lo of the conveyance roller 502 with respect to the exit window as the movement path information Ip as illustrated in FIG. 4. Such a configuration is advantageous in terms of implementing the printing corresponding to the three-dimensional movement path.

According to the above eighth aspect, the laser marking apparatus L executes the correction based on the movement path information Ip by correcting the correspondence relationship between the scanning position of the laser light and the control parameter of the laser light scanning section 4. Such a configuration is advantageous in terms of implementing the printing corresponding to the three-dimensional movement path.

Other Embodiments

In the above embodiment, the input interface Iu as the path information reception unit is configured to receive the input of the movement path information Ip, but the disclosure is not limited to such a configuration. The marker controller 100 may acquire the movement path information Ip by reading design data such as CAD data, or may measure a surface shape of the workpiece W with a laser light and set the movement path information Ip based on a result of the measurement.

In addition, the disclosure may be applied to marking on the workpiece W that is moving along a movement path (so-called moving printing), or may be applied to marking on the workpiece W that is stationary in the middle of a movement path (so-called stationary printing).

In addition, the disclosure can also be applied to the laser marking apparatus L including a mechanism (so-called Z scanner) capable of adjusting a focal length of laser light.

In addition, a movement path to which the disclosure is applied is not limited to one illustrated in FIG. 4. Two or more areas, which protrude in the +Z direction or the −Z direction similarly to the second conveyance area R12 in the above embodiment, may be provided. In addition, a protruding shape is not limited to one having an arcuate cross section as in the second conveyance area R12. The movement path may have a shape protruding like a corner.

As a specific example of another movement path, the disclosure can be applied to a workpiece $W_2$ conveyed along a movement path on a U-shaped cross section defined by a first conveyance roller 1501, a second conveyance roller 1502, a third conveyance roller 1503, and a fourth conveyance roller 1504, for example, as illustrated in FIG. 13.

What is claimed is:

1. A laser marking apparatus comprising:

a laser light output section that generates laser light based on excitation light and outputs the laser light;

a laser light scanning section that scans a surface of a workpiece with the laser light output from the laser light output section;

a print data generation section that generates print data;

a marking control section that controls the laser light output section and the laser light scanning section based on the print data generated by the print data generation section to perform marking using the laser light on the workpiece arranged on a print surface;

a print pattern reception unit that receives an input of a print pattern that needs to be marked;

a storage section that stores movement path information related to a movement path of the workpiece that moves with a change in a posture in a three-dimensional space, the workpiece being a sheet-like flexible workpiece conveyed by a conveyance support section, the movement path information related to the conveyance support section; and a print pattern correction section that corrects the print pattern received by the print pattern reception unit based on the movement path information stored in the storage section, wherein the print data generation section generates the print data based on the print pattern corrected by the print pattern correction section.

2. The laser marking apparatus according to claim 1, wherein the marking control section has a function of acquiring movement information of the workpiece, and the marking control section controls the laser light scanning section based on a moving speed specified by the movement information of the workpiece such that a scanning line forming print data generated by the print data generation section follows the change in the posture accompanying the movement of the workpiece.

3. The laser marking apparatus according to claim 1, further comprising a display unit that displays a setting plane which is defined by an orthogonal coordinate system and associated with a scanning range by the laser light scanning section, wherein the print pattern reception unit receives an input of the print pattern arranged on the setting plane displayed by the display unit.

4. The laser marking apparatus according to claim 1, wherein the movement path information includes movement path information related to a movement path of the flexible workpiece in a case where the conveyance support section, which sequentially supports different positions of the flexible workpiece and changes a posture of the flexible workpiece along the movement path of the flexible workpiece, is present within a scanning range by the laser light scanning section.

5. The laser marking apparatus according to claim 1, further comprising a path information reception unit that receives an input of the movement path information, wherein the print pattern correction section corrects the print pattern based on the movement path information received by the path information reception unit.

6. The laser marking apparatus according to claim 1, further comprising a housing that accommodates the laser light output section and the laser light scanning section, wherein the workpiece is made of a sheet-like film placed around a conveyance roller and conveyed in a predetermined conveyance direction by rotation of the conveyance roller, the print surface includes at least one of a first conveyance surface that extends while being inclined toward the conveyance roller, a second conveyance surface that is in contact with the conveyance roller and is curved to protrude in a direction approaching or separating from the housing, and a third conveyance surface that extends while being inclined to be separated from the conveyance roller, the first conveyance surface, the second conveyance surface, and the third conveyance surface being arranged in order from an upstream side in the conveyance direction, and the movement path information includes information related to the conveyance roller.

7. The laser marking apparatus according to claim 6, wherein the movement path information includes a diameter of the conveyance roller.

8. The laser marking apparatus according to claim 6, wherein the movement path information includes an inclination angle of at least one of the first and third conveyance surfaces with respect to the conveyance direction.

9. The laser marking apparatus according to claim 6, wherein the movement path information includes a distance between the housing and the conveyance roller in an irradiation direction from the housing toward the workpiece.

10. The laser marking apparatus according to claim 6, wherein an exit window that transmits the laser light to be scanned by the laser light scanning section is formed in the housing, and the movement path information includes an offset amount of the conveyance roller in the conveyance direction with respect to a center line passing through a central portion of the exit window.

11. The laser marking apparatus according to claim 1, wherein the print pattern correction section corrects a correspondence relationship between a scanning position of the laser light by the laser light scanning section and a control parameter of the laser light scanning section based on the movement path information, and the marking control section controls the laser light scanning section based on the corrected correspondence relationship such that the print pattern that needs to be marked is marked on the print surface.

* * * * *